(12) United States Patent
Ivarsson et al.

(10) Patent No.: US 12,477,375 B2
(45) Date of Patent: Nov. 18, 2025

(54) MODIFYING RADIO UNIT OPERATIONAL PARAMETERS

(71) Applicant: Dell Products L.P., Round Rock, TX (US)

(72) Inventors: Tommy Ivarsson, Ottawa (CA); Sewvanda Don, Ottawa (CA); John Bradley Deforge, Chelsea (CA)

(73) Assignee: Dell Products L.P., Round Rock, TX (US)

( * ) Notice: Subject to any disclaimer, the term of this patent is extended or adjusted under 35 U.S.C. 154(b) by 684 days.

(21) Appl. No.: 17/660,360

(22) Filed: Apr. 22, 2022

(65) Prior Publication Data
US 2023/0345288 A1 Oct. 26, 2023

(51) Int. Cl.
H04W 28/02 (2009.01)
H04W 28/08 (2023.01)
H04W 28/20 (2009.01)

(52) U.S. Cl.
CPC ... *H04W 28/0221* (2013.01); *H04W 28/0925* (2020.05); *H04W 28/0983* (2020.05); *H04W 28/20* (2013.01)

(58) Field of Classification Search
CPC ......... H04W 28/0221; H04W 28/0925; H04W 28/0983; H04W 28/20; H04W 72/52; H04W 88/085; H04B 1/401
See application file for complete search history.

(56) References Cited

U.S. PATENT DOCUMENTS

| | | | |
|---|---|---|---|
| 2009/0257387 A1 | 10/2009 | Gholmieh et al. | |
| 2011/0170466 A1 | 7/2011 | Kwun | |
| 2013/0203434 A1* | 8/2013 | Blume | H03F 3/24 455/452.1 |
| 2013/0242720 A1 | 9/2013 | Chou | |
| 2016/0198405 A1* | 7/2016 | Choi | H04W 52/0206 370/311 |
| 2019/0289541 A1* | 9/2019 | Fischer | H04W 52/346 |
| 2021/0328902 A1* | 10/2021 | Huselton | H04L 43/16 |
| 2022/0182105 A1* | 6/2022 | Ota | H04B 7/01 |
| 2022/0239380 A1* | 7/2022 | Du | H04B 10/58 |
| 2023/0006933 A1* | 1/2023 | Gaydos | H04W 72/0446 |

(Continued)

FOREIGN PATENT DOCUMENTS

| | | |
|---|---|---|
| EP | 2439988 | 4/2012 |
| WO | 02/07464 | 1/2002 |

(Continued)

OTHER PUBLICATIONS

International Search Report and Written Opinion mailed Mar. 31, 2023 for PCT Application No. PCT/US2022/053286, 19 pages.

(Continued)

*Primary Examiner* — Clemence S Han

(74) *Attorney, Agent, or Firm* — Amin, Turocy & Watson, LLP

(57) ABSTRACT

A system can comprise a distributed unit that is configured to process traffic and traffic load scheduling to produce processed traffic, and to communicate the processed traffic and traffic load scheduling to the radio unit. The system can further comprise a radio unit that is configured to modify operational parameters of the radio unit based on the processed traffic and traffic load scheduling received from the distributed unit.

20 Claims, 22 Drawing Sheets

(56) References Cited

U.S. PATENT DOCUMENTS

2023/0208559 A1* 6/2023 Rama Chandran ... H04L 1/1607
370/328
2023/0379980 A1* 11/2023 Göransson ............ H04W 74/04
2023/0388922 A1* 11/2023 Eleftheriadis ....... H04W 52/223
2023/0397105 A1* 12/2023 Brobston .............. H04L 5/0087

FOREIGN PATENT DOCUMENTS

WO       2021/063474      4/2021
WO    WO-2023050176 A1 *  4/2023    ........ H04W 28/0942

OTHER PUBLICATIONS

Notification Concering Transmittal of International Preliminary Report on Patentability mailed Oct. 31, 2024 for PCT Application No. PCT/US2022/053286, 9 pages.
European Office Action mailed Nov. 29, 2024 for European Patent Application No. 22850853.7, 3 pages.

* cited by examiner

500

```
┌─────────────────────────────────────────────────┐
│  DISTRIBUTED UNIT THAT IS CONFIGURED TO PROCESS │
│  TRAFFIC AND TRAFFIC LOAD SCHEDULING TO PRODUCE │
│    PROCESSED TRAFFIC, AND TO COMMUNICATE THE    │
│  PROCESSED TRAFFIC AND TRAFFIC LOAD SCHEDULING  │
│              TO THE RADIO UNIT 502              │
└─────────────────────────────────────────────────┘

┌─────────────────────────────────────────────────┐
│       RADIO UNIT THAT IS CONFIGURED TO MODIFY   │
│   OPERATIONAL PARAMETERS OF THE RADIO UNIT BASED│
│    ON THE PROCESSED TRAFFIC AND TRAFFIC LOAD    │
│ SCHEDULING RECEIVED FROM THE DISTRIBUTED UNIT 504│
└─────────────────────────────────────────────────┘

┌─────────────────────────────────────────────────┐
│   AT LEAST ONE ACTUATOR OF THE RADIO UNIT THAT  │
│   IS CONFIGURED TO ENGAGE TO MODIFY THE         │
│         OPERATIONAL PARAMETERS 506              │
└─────────────────────────────────────────────────┘
```

FIG. 5

MODIFYING RADIO UNIT OPERATIONAL PARAMETERS

BACKGROUND

A radio can comprise a receiver and a transmitter that are used to receive and transmit, respectively, data.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can comprise a distributed unit that is configured to process traffic and traffic load scheduling to produce processed traffic, and to communicate the processed traffic and traffic load scheduling to the radio unit. The system can further comprise a radio unit that is configured to modify operational parameters of the radio unit based on the processed traffic and traffic load scheduling received from the distributed unit.

An example method can comprise processing, by a system comprising a processor, traffic and traffic load scheduling at a distributed unit produce processed traffic. The method can further comprise modifying, by the system, operational parameters of a radio unit based on the processed traffic and traffic load scheduling.

An example apparatus can comprise a processing component that is configured to process traffic and traffic load scheduling at a distributed unit of a radio system to produce processed traffic. The apparatus can further comprise a modifying component that is configured to modify operational parameters of a radio unit of the radio system based on the processed traffic and traffic load scheduling.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates another example system architecture that can facilitate modifying radio unit operational parameters, in accordance with an embodiment of this disclosure;

DETAILED DESCRIPTION

Overview

Figure 1A:
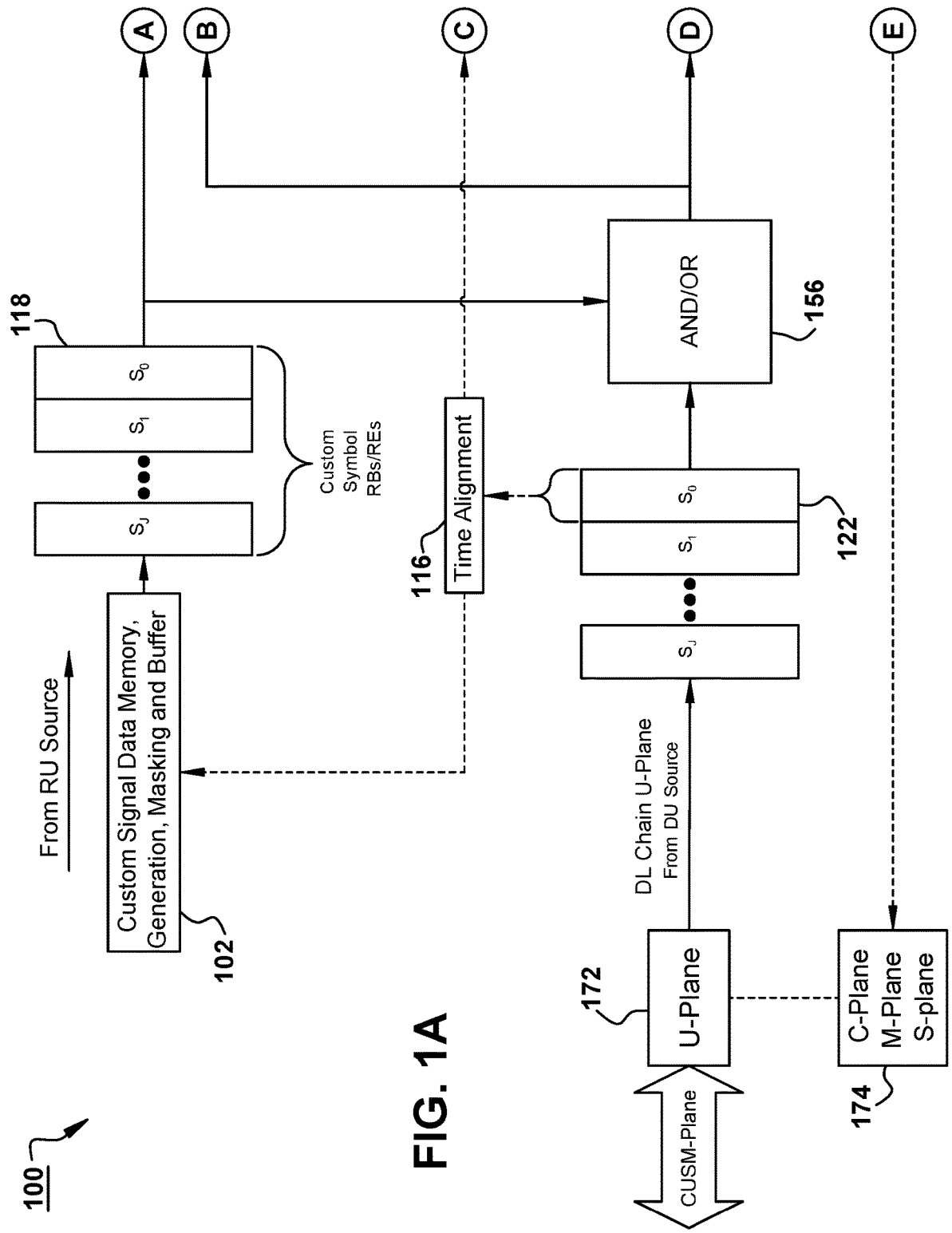
FIG. 1A, FIG. 1B, and FIG. 1C illustrate an example system architecture of a down link chain of a radio system, and that can facilitate modifying radio unit operational parameters, in accordance with an embodiment of this disclosure.

In modern wireless communications deployments, aspects and impacts of radio development engineering and system design tradeoffs can have far-reaching implications into customer capital expenditures, operating expenditures and overall completeness of a vendor's radio offerings. These engineering and systems design tradeoffs can result in what can be generally characterized as overall radio size, weight, thermal dissipation, reliability, complexity, and cost.

In some radio systems, amplifiers can consume greater than 50% of the power consumed by the radio system, and produce approximately 50% of the heat to be dissipated within the physical dimensions of the radio. In some examples, a key driver of radio design can therefore be amplifier design and an ability to derive efficiency improvements.

In some examples according to the present techniques, a distributed unit of a radio system can communicate with a radio unit of the radio system regarding traffic and traffic load scheduling to improve performance of the radio unit. This improved performance of the radio unit can benefit a user of the radio system.

The present techniques can be implemented to modify radio unit operational parameters based on distributed unit messaging relating to a dynamicity of traffic. Actuators in a radio unit can be accessible for modification through techniques such as direct access by distributed unit messaging, deterministic approaches, and/or prescriptive approaches to affect operational efficiency performance in a timely manner.

In some examples, operational efficiency can be improved through a priori knowledge of traffic dynamics and distributed unit messaging with direct access to actuators on a radio unit.

In some examples, a radio unit operates to modify actuator values based on messaging received from a distributed unit, thus modifying parameters based on a dynamicity of traffic.

Traffic dynamics or traffic loading can be communicated by a distributed unit to a radio unit a priori for a purpose of improving radio system efficiency.

In some examples, operational parameter modifications can be timed and synchronized with a dynamic load of signal data received by a radio unit.

The present techniques can be implemented to improve radio unit efficiency through modifying configurable operational parameters as a result of messaging from a distributed unit. Reconfiguration of operational parameters can be controlled by actuators, where control of the actuators can be facilitated by direct messaging from a distributed unit, deterministic, or prescriptive approaches.

In some examples, the present techniques can provide coverage for all antenna branches in a radio system. In some examples, actuators in a radio unit are accessible for modification through deterministic or prescriptive approaches to affect operational efficiency performance in a timely manner.

In some cases, a radio unit can perform a change to a power amplifier (PA) bias via actuators to control PA source voltage ($V_{dd}$) and gate biases for a purpose of improving (e.g., lessening) power consumption of a radio.

A radio unit and a distributed unit can communicate for a purpose of radio unit parameter modification via c-plane messaging. In some examples, signal timing and synchronization with actuator control can be employed to ensure proper alignment of signals with actuator control and parameter modification.

In some examples, a radio unit's actuators can be directly modified by interpretation of c-plane messaging from a distributed unit. In some examples, a radio unit's actuators can be modified by a radio unit through deterministic or prescriptive approaches within a domain of a radio unit following c-plane messaging from a distributed unit.

In some examples, a radio unit can communicate to a distributed unit that, due to system performance measurements, the radio unit needs the distributed to rapidly lessen traffic load. The distributed unit can then message the radio unit regarding having lessened the loading.

The present techniques can be implemented to facilitate distributed unit and radio unit interaction. A distributed unit scheduler can have knowledge of traffic levels in advance of transmission. The distributed unit can communicate with the radio unit regarding forthcoming traffic a priori. The radio unit can communicate with the distributed unit for a purpose of an expressed need for traffic load reduction or traffic dynamicity reduction.

The distributed unit can comprise a scheduler with configurable thresholds based on forthcoming traffic load utilization and modeling. A distributed unit can have direct access to radio unit actuators, and an ability to reconfigure key performance parameters via messages on a radio unit's c-plane to optimize for upcoming traffic load.

In some examples, a radio unit can reconfigure key performance parameters via actuators to optimize for upcoming traffic load resulting from a priori traffic information messaging received from a distributed unit.

In some examples where a distributed unit autonomously withholds scheduling of traffic, either partially or wholly, to an advantage of lessening radio unit power consumption by lessening or modification of a duty cycle of a traffic load, a radio unit can respond in kind with a commensurate lessening of power amplifier bias parameters. In some examples, a priori knowledge of traffic load can be leveraged to modify radio unit parameters and realize energy savings in a user's network deployment.

Example Architectures

Figure 1B:
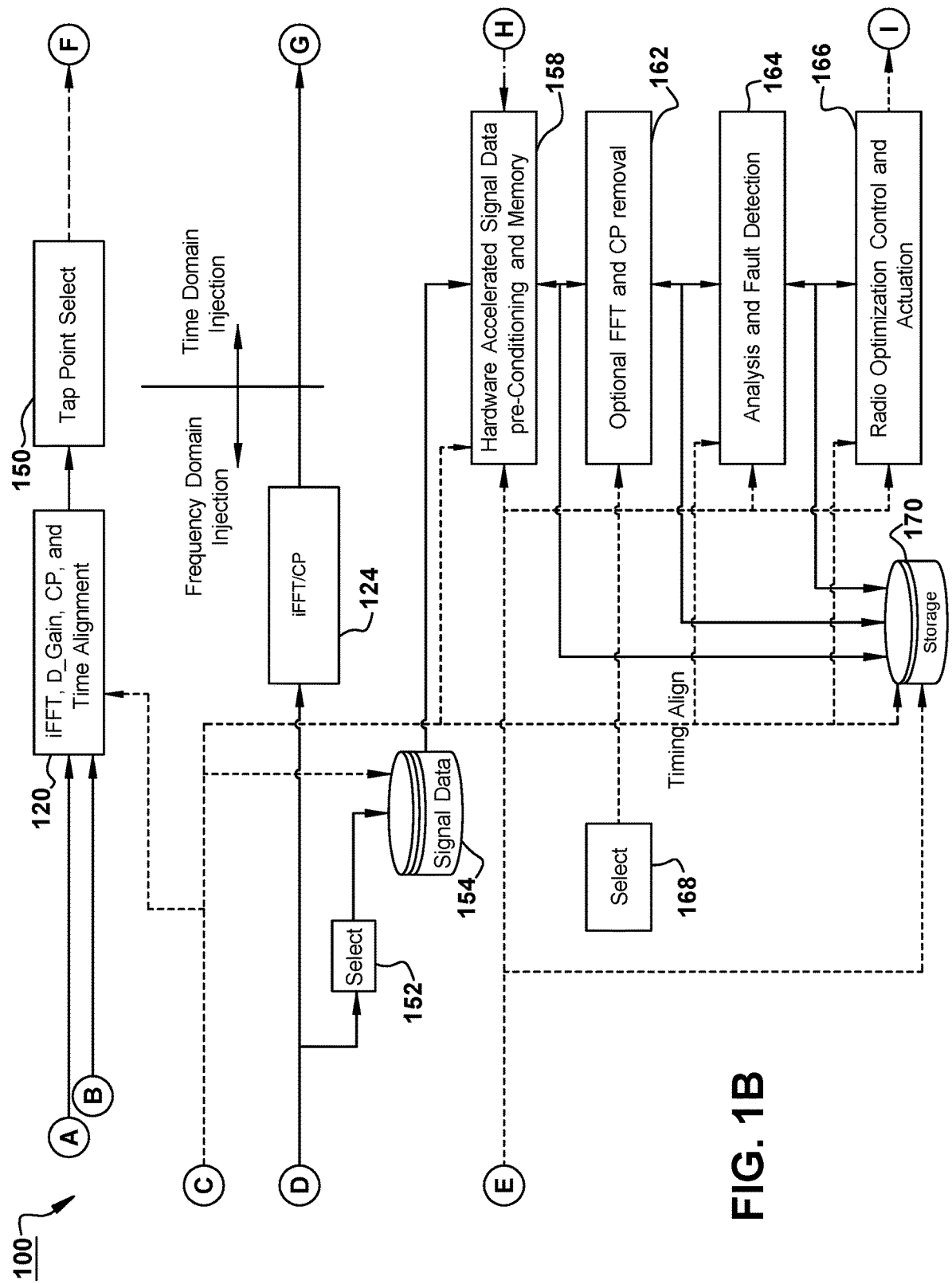
Figure 1C:
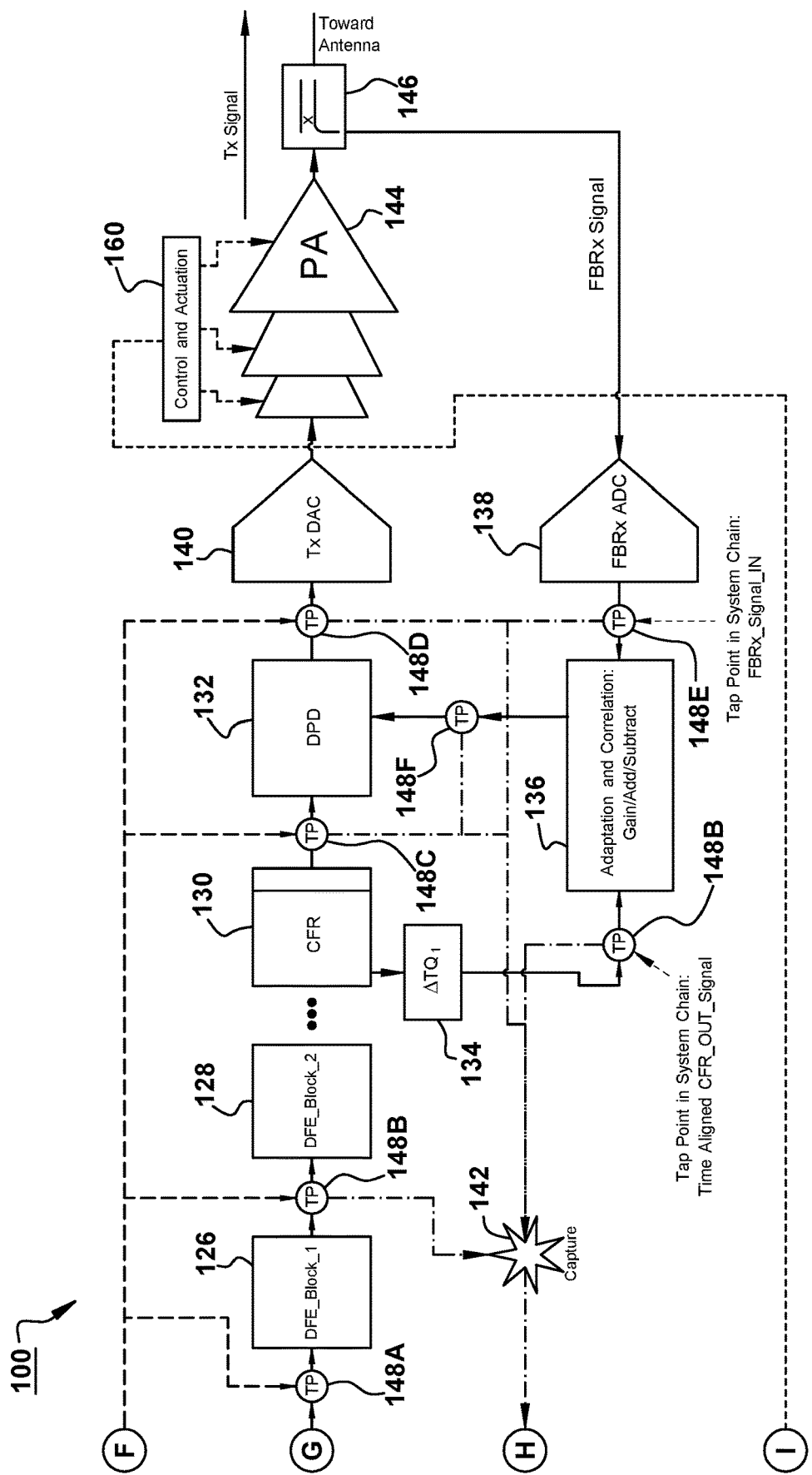

FIG. 1A, FIG. 1B, and FIG. 1C illustrate an example system architecture 100 of a down link chain of a radio system, and that can facilitate modifying radio unit operational parameters, in accordance with an embodiment of this disclosure.

System architecture 100 can function as a down link signal path of a radio. As depicted, system architecture 100 comprises custom signal data memory, generation, masking, and buffer 102 (which can comprise a combination of some or all of a look up table, a pseudo-random look up table generator, a generator, a memory, an OR gate to combine data sources, masking, and a buffer), time alignment 116, custom symbol resource bands/resource elements (RBs/REs) 118, inverse Fast Fourier Transform (iFFT) 120 (which can also perform Δ gain, time alignment, and optional cyclic prefix (CP) insertion), RB/RE 122, iFFT/CP 124, digital front end (DFE) block 1 126, DFE block 2 128, crest factor reduction (CFR) 130, digital pre-distortion (DPD) 132, delta-time-phase (ΔTΘ) 134, adaptation and correlation 136, feedback receiver analog-to-digital converter (FBRx ADC) 138, transmitter digital to—analog converter (Tx ADC) 140, capture 142, power amplifier 144, signal coupler 146, tap point 148A, tap point 148B, tap point 148C, tap point 148D, tap point 148E, tap point 148F (which can be accessed to capture a FBRx Signal IN), tap point 148G (which can be accessed to capture a CFR OUT Signal), tap point select 150, select 152, signal data 154, AND/OR 156, hardware accelerated signal data pre-conditioning and memory 158, optional FFT and CP removal 162, analysis and fault detection 164, radio optimization control and actuation 166, select 168, storage 170, U-plane 172, and C-plane, M-plane, and S-plane 174.

In different examples, different blocks of system architecture 100 can be implemented and/or used. For example, optional FFT and CP removal 162 can be selectively implemented and/or used to provide a time domain full signal (no FFT, and no CP removal); to provide time domain data only (no FFT, with CP removal); to provide frequency domain of a whole signal (with FFT, no CP removal); and/or frequency domain data only (with FFT, with CP removal).

In system architecture 100, each tap point (e.g., tap point 148A) can serve as a multiplexer where one copy of the signal is sent through the signal chain as it would be if there were no tap point, and another copy of the signal is sent to be selectively captured. Time alignment 116 can align a signal at each tap point with a system time of the down link chain.

A copy of a signal that is split at a tap point can be sent to capture 142, where the signal can be captured. As depicted, each tap point is in the time domain of the down link chain, and there can be examples where a tap point is positioned in a frequency domain portion of the down link chain.

Once captured, the captured signal can proceed through hardware accelerated signal data pre-conditioning and memory 158. Hardware accelerated signal data pre-conditioning and memory 158 can perform operations such as optional FFT and optional CP removal, analysis, and storage. A result of this analysis can be used to cause actuators to change operational parameters of the radio system.

Figure 2A:
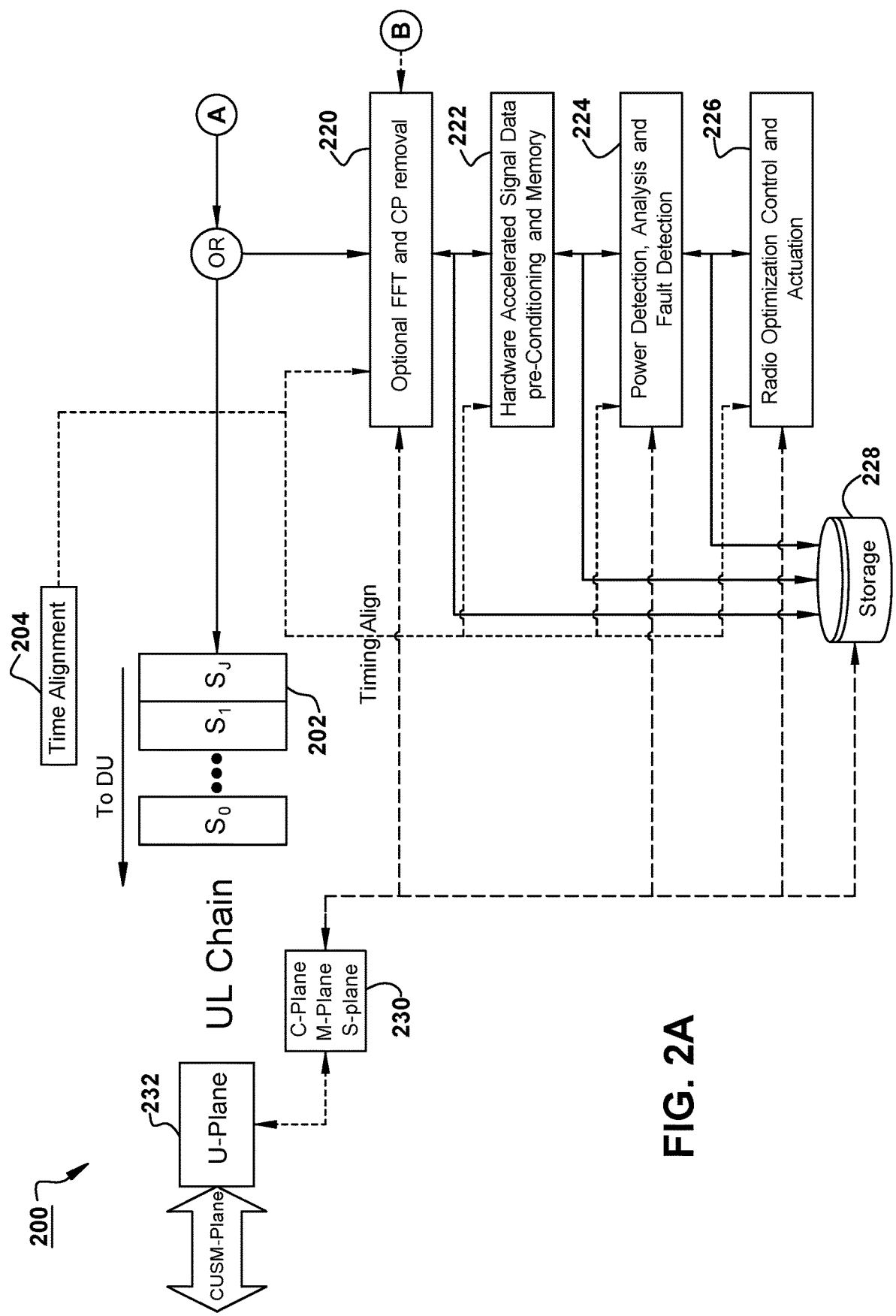
FIG. 2A and FIG. 2B illustrate an example system architecture for an up link chain of a radio system, and that can facilitate modifying radio unit operational parameters.
Figure 2B:
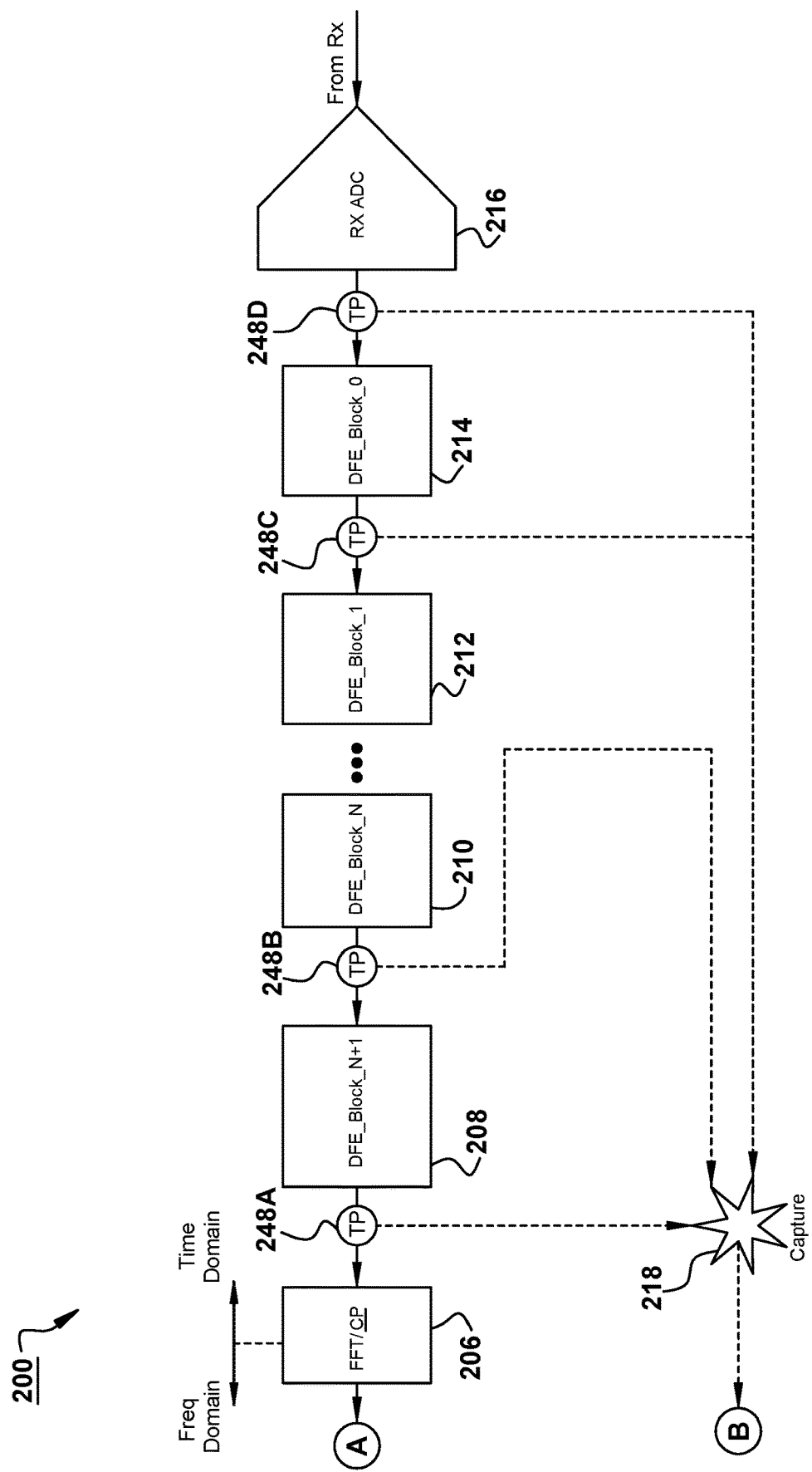
Figure 3A:
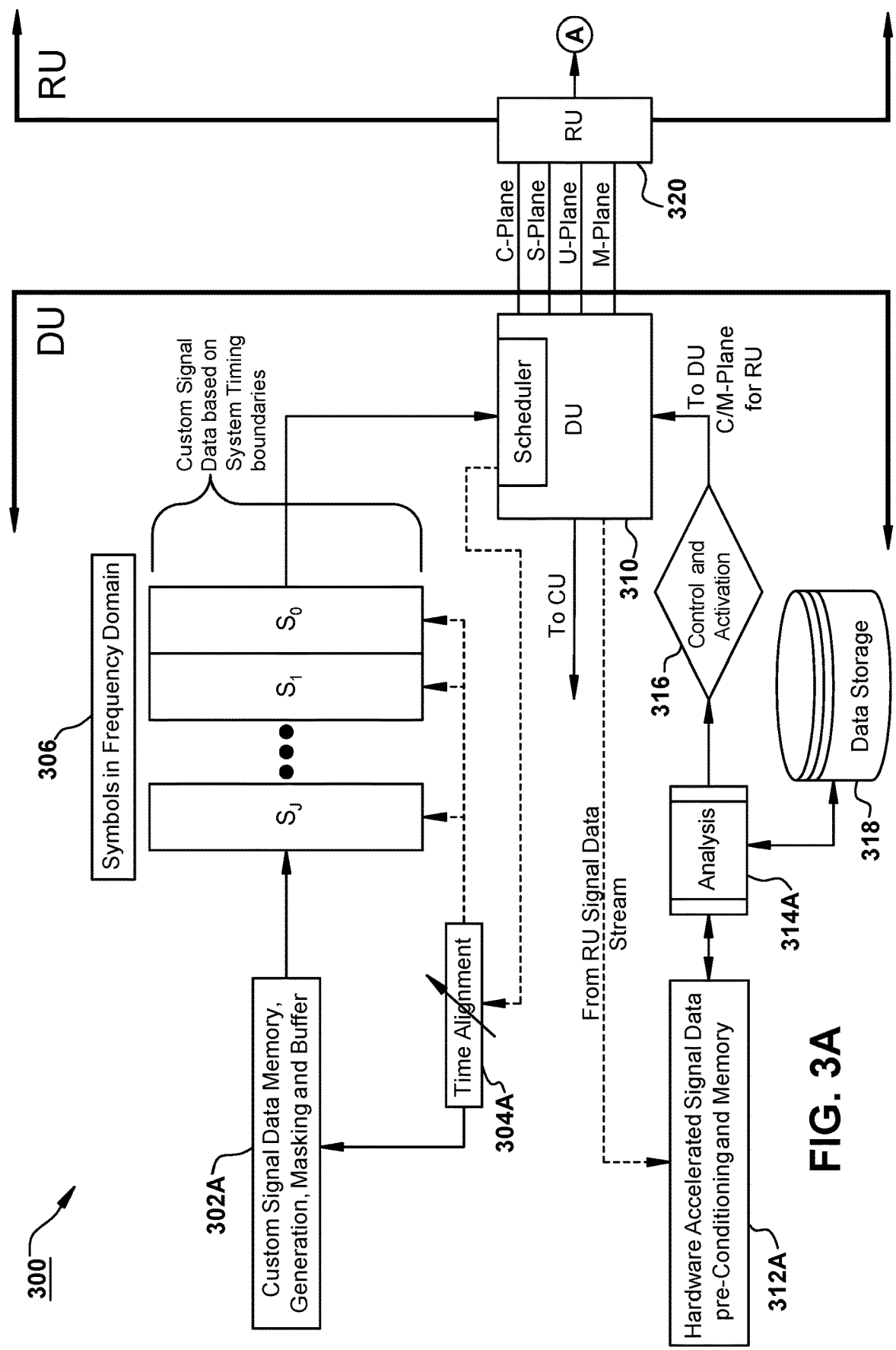
FIG. 3A, FIG. 3B, FIG. 3C, and FIG. 3D illustrate an example system architecture for a radio system, and that can facilitate modifying radio unit operational parameters, in accordance with an embodiment of this disclosure.
Figure 3B:
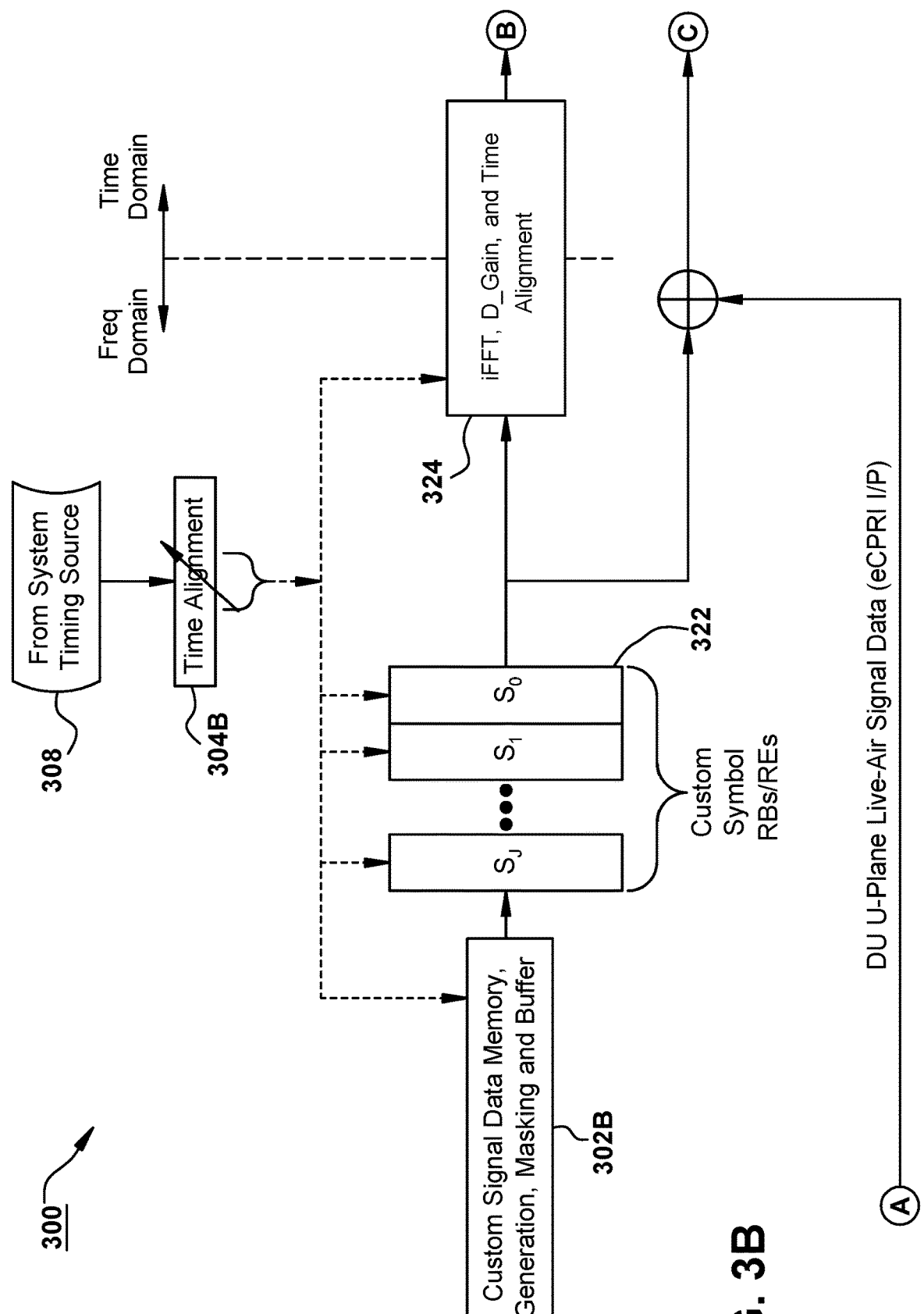
Figure 3C:
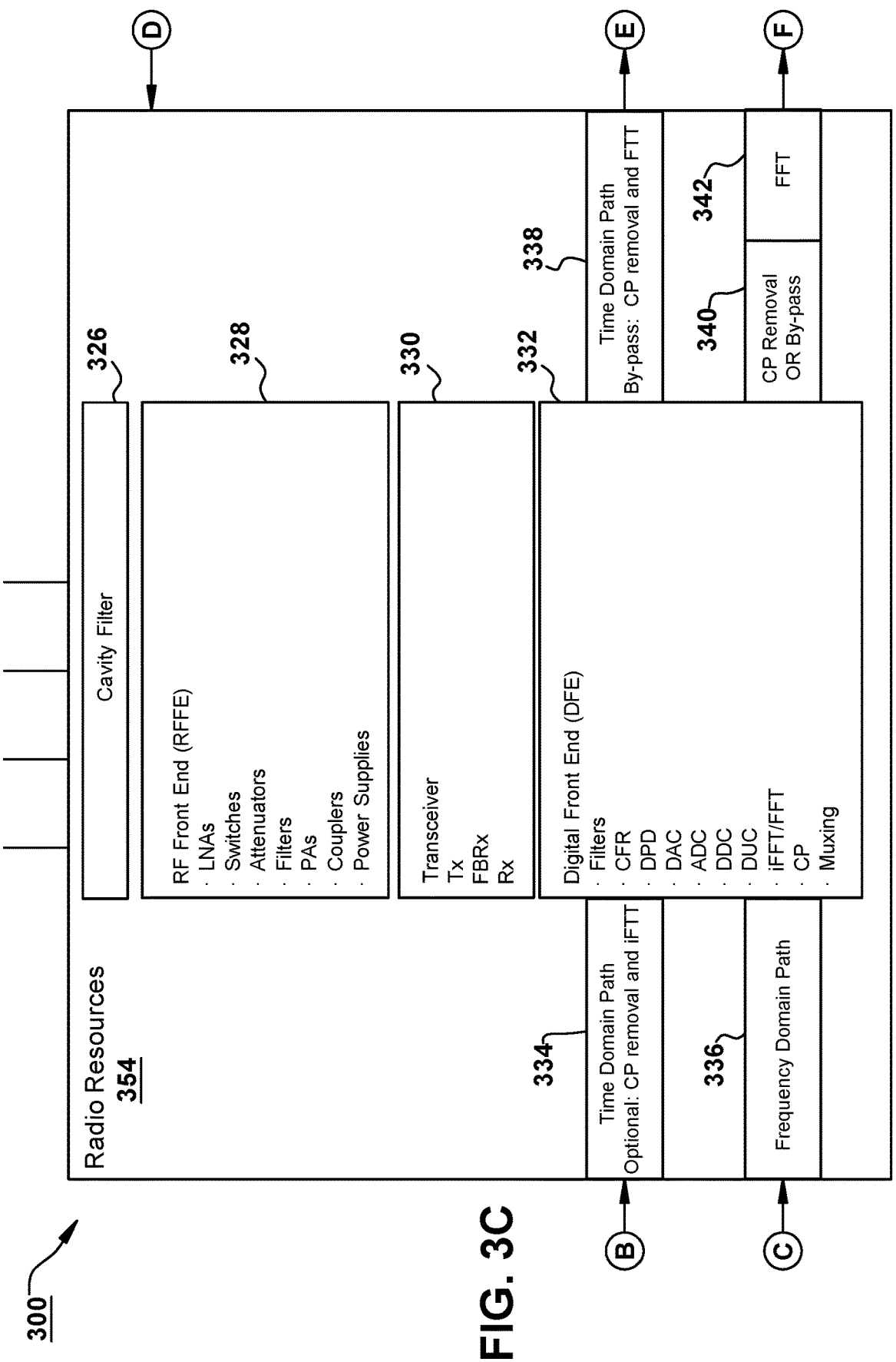
Figure 3D:
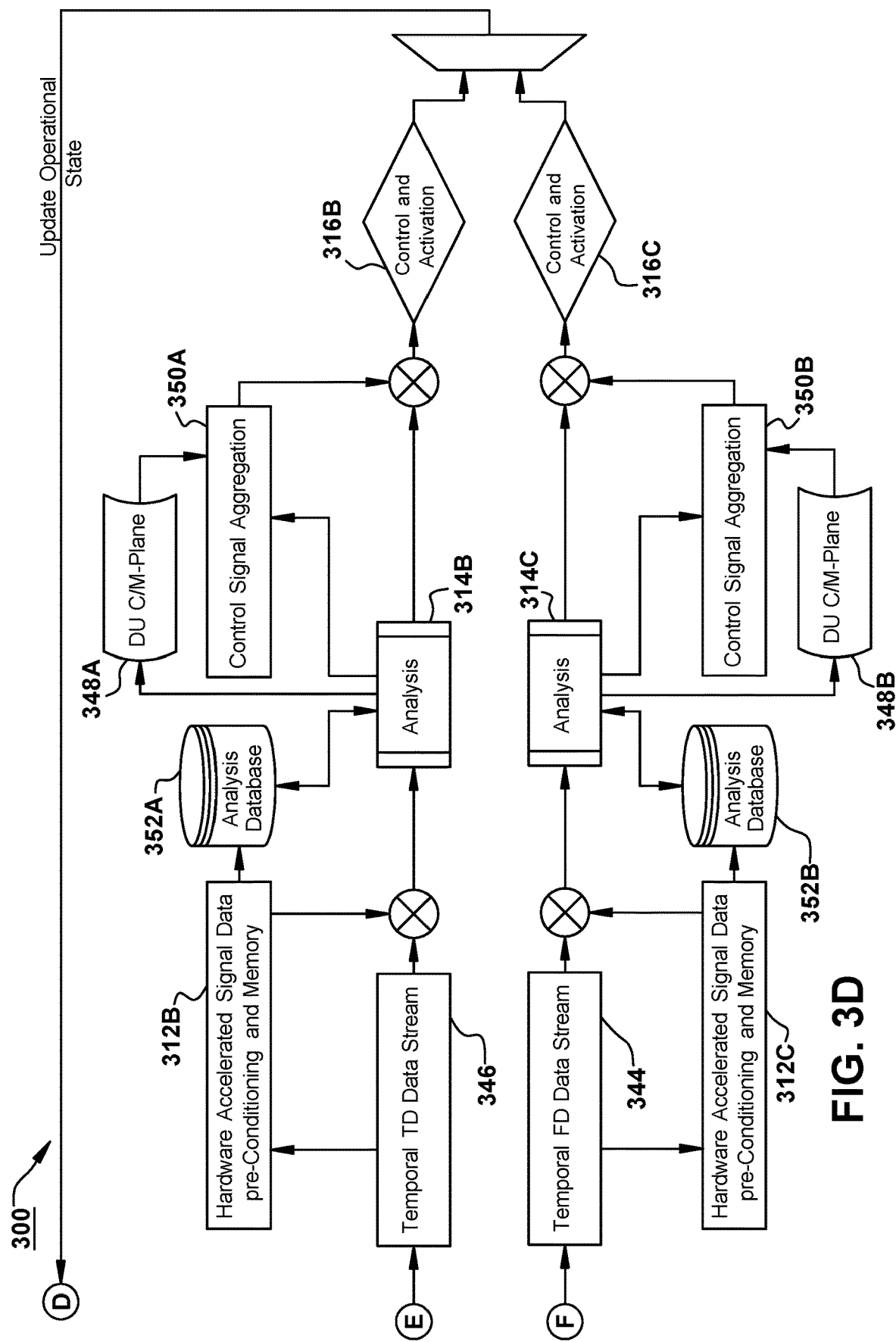

FIG. 2A and FIG. 2B illustrate an example system architecture 200 for an up link chain of a radio system, and that can facilitate modifying radio unit operational parameters. In some examples, system architecture 200 can be implemented in conjunction with system architecture 100, where system architecture 200 implements an up link chain of a radio system, and system architecture 100 implements a corresponding down link chain.

As depicted, system architecture 200 comprises custom symbol RBs/REs 202; time alignment 204; FFT/CP 206; DFE block N+1 208; DFE block N 210; DFE block 1 212; DFE block 0 214; Rx ADC 216; capture 218; optional FFT and CP removal 220; hardware accelerated signal data pre-conditioning and memory 222; power detection, analysis, and fault detection 224; radio optimization control and actuation 226; storage 228; C-plane, M-plane, S-plane 232; U-plane 234; tap point 248A (which can be similar to an instance of tap point 148A); tap point 248B (which can be similar to an instance of tap point 148A); tap point 248C (which can be similar to an instance of tap point 148A); and tap point 248D (which can be similar to an instance of tap point 148A).

In system architecture 200, each tap point (e.g., tap point 248A) can serve as a multiplexer where one copy of the signal is sent through the signal chain as it would be if there were no tap point, and another copy of the signal is sent to be selectively captured. Time alignment 204 can align a signal at each tap point with a system time of the down link chain.

A copy of a signal that is split at a tap point can be captured. Some tap points can be positioned in the time domain of the up link chain (e.g., tap point 248A, tap point 248B, tap point 248C, and tap point 248D). In some examples, some tap points can be positioned in a frequency domain portion of the down link chain.

Once captured, the captured signal can be processed with hardware accelerated signal data pre-conditioning and memory (which can include operations such as optional FFT and optional CP removal, analysis, and storage. A result of this analysis can be used to cause actuators to change operational parameters of the radio system.

FIG. 3A, FIG. 3B, FIG. 3C, and FIG. 3D illustrate an example system architecture 300 for a radio system, and that can facilitate modifying radio unit operational parameters, in accordance with an embodiment of this disclosure. In some examples, system architecture can comprise a radio system that can comprise part(s) of system architecture 100, and/or system architecture 200.

As depicted, system architecture 300 comprises custom signal data memory, generation, masking, and buffer 302A and custom signal data memory, generation, masking, and buffer 302B; time alignment 304A and time alignment 304B; custom symbol RBs/REs 306; from timing system source 308; distributed unit 310; hardware accelerated signal data, pre-conditioning and memory 312A, hardware accelerated signal data, pre-conditioning and memory 312B, and hardware accelerated signal data, pre-conditioning and memory 312C; analysis 314A, analysis 314B, and analysis 314C; control and activation 316A, control and activation 316B, and control and activation 316C; data storage 318; RU 320; custom symbol RBs/REs 322; inverse Fast Fourier Transform (iFFT) 324 (which can also perform Δ gain, cyclic prefix insertion, and time alignment); cavity filter 326; radiofrequency (RF) front end (RFFE) 328 (which can include low noise amplifiers (LNAs), switches, attenuators, filters, PAs, couplers, and power supplies); transceiver 330 (which can include Tx, FBRx, and Rx); digital front end 332 (which can include filters, CFR, DPD, a digital to analog converter (DACs), an analog to digital converter (ADC), a digital down converters (DDC), a digital up converter (DUC), and iFFT/FFT, CP, and multiplexing); time domain path 334 (which can bypass CP injection and iFFT); frequency domain path 336; time domain path 338 (which can bypass CP removal and FFT); CP removal or bypass 340; FFT 342; temporal frequency domain (FD) data stream 344; temporal time domain (TD) data stream 346; DU C/M-plane 348A and DU C/M-plane 348B; control system aggregation 350A and control system aggregation 350B; analysis database 352A and analysis database 352B; and radio resources 354.

Hardware accelerated signal data, pre-conditioning and memory 312A, and hardware accelerated signal data, pre-conditioning and memory 312C can perform frequency domain signal data detection. They can perform a binning operation, which can be akin to a functionality performed by a spectrum analyzer digitizer.

Hardware accelerated signal data, pre-conditioning and memory 312B can perform time domain signal data detection. It can perform binning and storage operations, which can be akin to an oscilloscope digitizer.

Custom signal data memory, generation, masking, and buffer 302A and custom signal data memory, generation, masking, and buffer 302B can perform signal generation at a distributed unit or a radio unit, respectively. They can perform local synchronized custom and live-air data stimulus with known characteristics. In some examples, they can operate in a frequency domain.

Analysis 314A, analysis 314B, and analysis 314C can perform signal capture data analysis. In some examples, they can implement artificial intelligence/machine learning (AI/ML) with training (such as live and stored real-time data, and statistical data). They can provide an output of a response to actuators to change operational parameters of a radio system.

Control and activation 316A, control and activation 316B, and control and activation 316C can take inputs that augment information available to an AI/ML component and output an affect to actuators of the radio system to change operational parameters.

In some examples, respective outputs of control and activation 316B and control and activation 316C can be aggregated to affect change on a radio and radio performance.

In some examples, a distributed unit portion of system architecture 300 can send messaging to a radio unit portion of system architecture 300 to cause the radio unit portion to modify operational parameters. In some examples, the radio unit portion of system architecture 300 can determine to modify radio unit operational parameters independently of messaging from the distributed unit portion. In some examples, the radio unit can modify radio unit operational parameters based on a combination of messaging received from the distributed unit portion and determinations made by the radio unit portion independent of the messaging received from the distributed unit portion.

Figure 4:
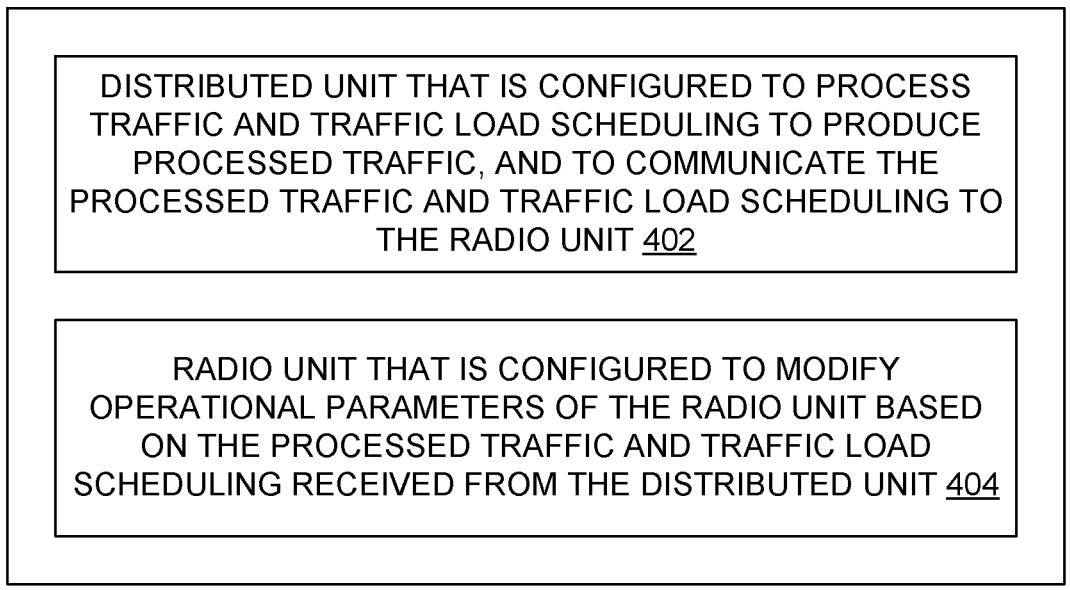
FIG. 4 illustrates an example system architecture that can facilitate modifying radio unit operational parameters, in accordance with an embodiment of this disclosure.

FIG. 4 illustrates an example system architecture 400 that can facilitate modifying radio unit operational parameters, in accordance with an embodiment of this disclosure.

System architecture 400 comprises distributed unit that is configured to process traffic and traffic load scheduling to produce processed traffic, and to communicate the processed traffic and traffic load scheduling to the radio unit 402; and radio unit that is configured to modify operational parameters of the radio unit based on the processed traffic and traffic load scheduling received from the distributed unit 404.

In some examples, distributed unit 402 can be similar to a distributed unit of system architecture 400, and can handle traffic scheduling, and communicate about traffic to radio unit 404. In some examples, radio unit 404 can use this traffic information to change its operational parameters (e.g., reduce power consumption where appropriate).

In some examples, modifying the operational parameters of the radio unit improves an operational efficiency of the radio unit. That is, system architecture 400 can be implemented to improve radio unit efficiency through modification of configurable operational parameters as a result of messaging from a distributed unit.

FIG. 5 illustrates another example system architecture 500 that can facilitate modifying radio unit operational parameters, in accordance with an embodiment of this disclosure.

System architecture 500 comprises distributed unit that is configured to process traffic and traffic load scheduling to produce processed traffic, and to communicate the processed traffic and traffic load scheduling to the radio unit 502 (which can be similar to distributed unit that is configured to process traffic and traffic load scheduling to produce processed traffic, and to communicate the processed traffic and traffic load scheduling to the radio unit 402 of FIG. 4); radio unit that is configured to modify operational parameters of the radio unit based on the processed traffic and traffic load scheduling received from the distributed unit 504 (which can be similar to radio unit that is configured to modify operational parameters of the radio unit based on the processed traffic and traffic load scheduling received from the distributed unit 404); and at least one actuator of the radio unit that is configured to engage to modify the operational parameters 506.

In some examples, at least one actuator of the radio unit that is configured to engage to modify the operational parameters 506 can be similar to control and actuation 160. Regarding at least one actuator 506, actuators in a radio unit can be accessible for modification through such techniques as direct access by distributed unit messaging, deterministic, or prescriptive techniques to affect operational efficiency performance in a timely manner.

In some examples, modifying the operational parameters by at least one actuator 506 can be timed and synchronized with a dynamic load of signal data received by the radio unit. That is, operational parameter modifications can be timed and synchronized with a dynamic load of signal data received by radio unit 504.

Figure 6:
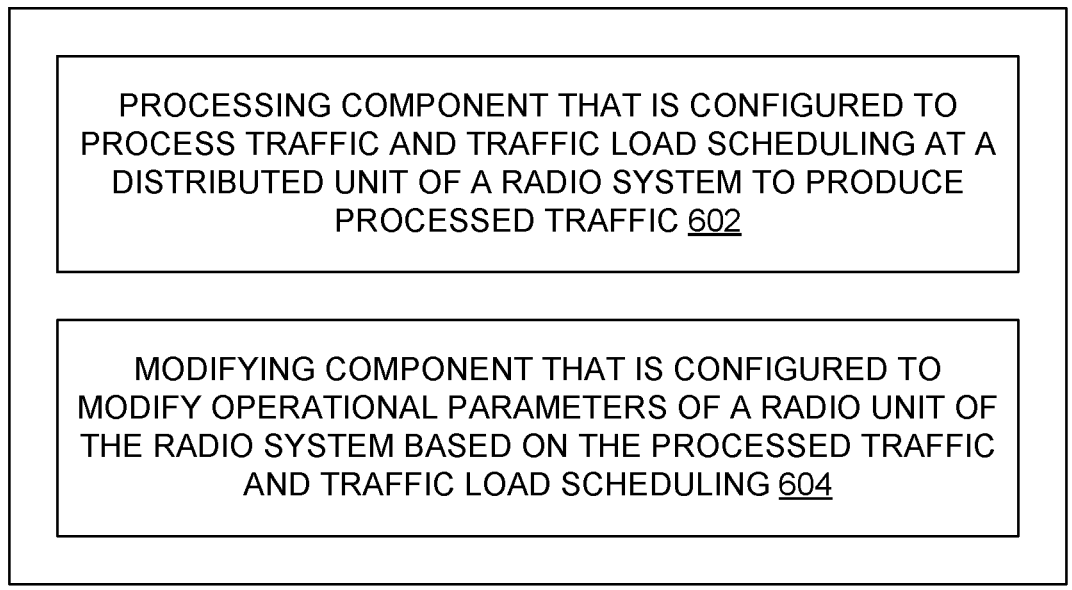
FIG. 6 illustrates another example system architecture that can facilitate modifying radio unit operational parameters, in accordance with an embodiment of this disclosure.

FIG. 6 illustrates another example system architecture 600 that can facilitate modifying radio unit operational parameters, in accordance with an embodiment of this disclosure.

System architecture 600 comprises processing component that is configured to process traffic and traffic load scheduling at a distributed unit of a radio system to produce processed traffic 602; and modifying component that is configured to modify operational parameters of a radio unit of the radio system based on the processed traffic and traffic load scheduling 604.

In some examples, processing component that is configured to process traffic and traffic load scheduling at a distributed unit of a radio system to produce processed traffic 602 can be similar to distributed unit that is configured to process traffic and traffic load scheduling to produce processed traffic, and to communicate the processed traffic and traffic load scheduling to the radio unit 402 of FIG. 4. In some examples, modifying component that is configured to modify operational parameters of a radio unit of the radio system based on the processed traffic and traffic load scheduling 604 can be similar to radio unit that is configured to modify operational parameters of the radio unit based on the processed traffic and traffic load scheduling received from the distributed unit 404.

In some examples, modifying component 602 is configured to modify the operational parameters by engaging an actuator of the radio unit, and modifying component 602 is configured to modify signal timing and synchronization associated with an actuator component relative to the radio unit. That is, in some examples, signal timing and synchronization with actuator control can be employed to ensure proper alignment of signals with actuator control and parameter modification.

In some examples modifying component 602 is configured to modify the operational parameters by engaging an actuator of the radio unit, and modifying component 602 is configured to modify performance of the radio unit to facilitate increasing a traffic load, to facilitate lessening the traffic load, based on determining that the traffic load has decreased, to facilitate lowering a thermal stress, or based on a modulation coding scheme level. That is, in some examples, the following operational parameter modifications can be effectuated: reverting back to normal operation (e.g., supporting increased traffic load after reducing a supported traffic load); modifying performance based on performance metrics gathered from a front end of a radio system, such as via tap points; modifying performance based on monitoring and/or determining modulation coding scheme levels; lowering a thermal stress of a radio system; and/or modifying performance based on lessening traffic.

In some examples, the radio unit is configured to communicate to the distributed unit a request to lessen the traffic load, and the distributed unit is configured to communicate to the radio unit an indication that the traffic load has been lessened. That is, in some examples, the radio unit can communicate to the distributed unit that, due to system performance measurements, the radio unit needs the distributed unit to rapidly lessen traffic load. The distributed unit can then message the radio unit regarding the distributed unit having lessened the traffic load.

In some examples, the distributed unit is configured to withhold scheduling of the traffic independent of the radio unit, where the withholding scheduling of the traffic comprises modifying a duty cycle of the traffic, and where the withholding scheduling of the traffic reduces a power consumption of the radio unit. In some examples, the radio unit is configured to reduce a power amplifier bias parameter in response to the distributed unit withholding scheduling of the traffic. That is, in some examples where a distributed unit can autonomously withhold scheduling or traffic, either partially or wholly, to an advantage of lessening radio unit power consumption by lessening or modifying a duty cycle of a traffic load, a radio unit can respond with a commensurate lessening of power amplifier bias parameters. In some cases, a priori knowledge of traffic load can be leveraged to modify radio unit parameters and realize energy savings in a user's network deployment.

Example Process Flows

Figure 7:
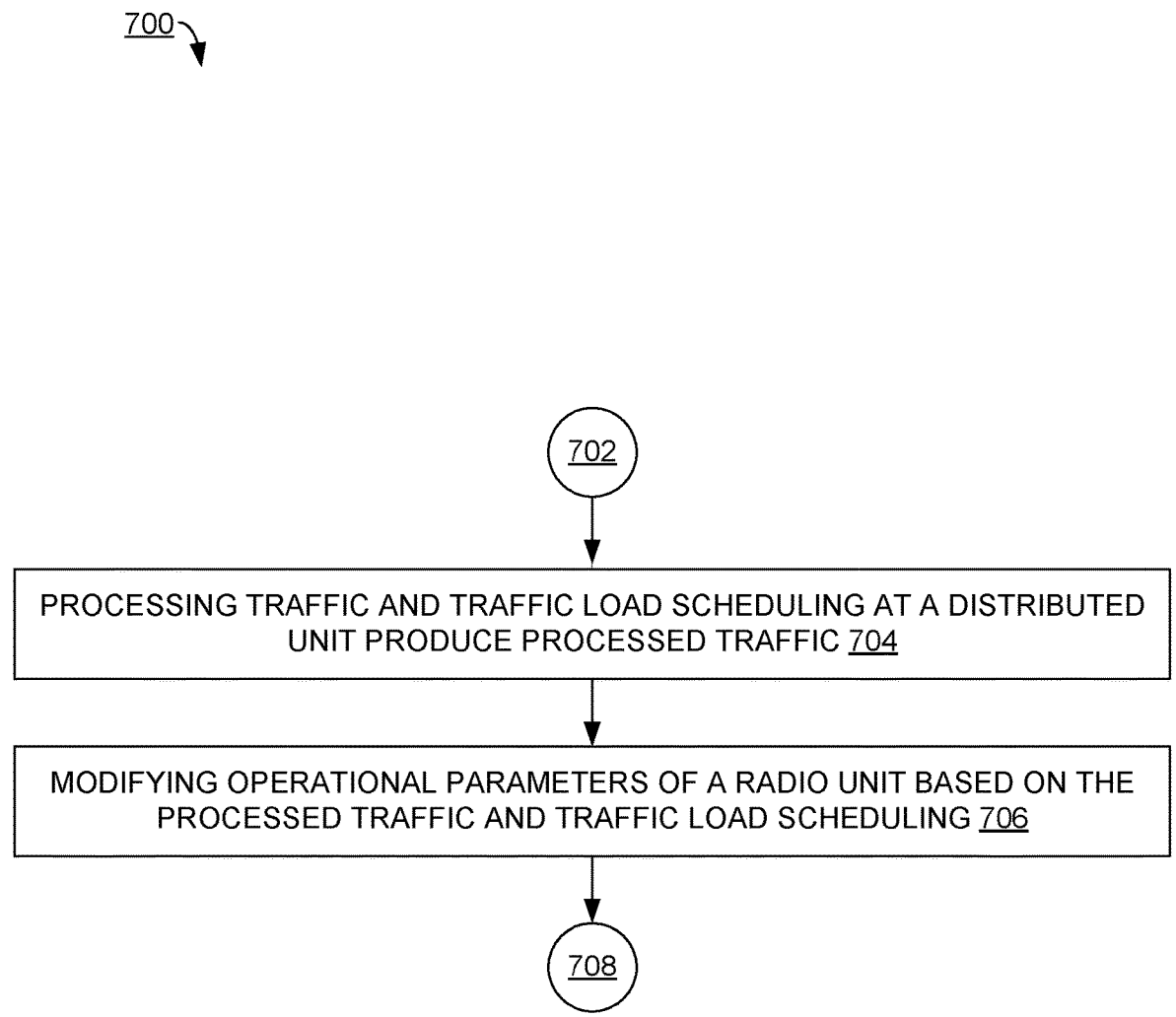
FIG. 7 illustrates an example process flow that can facilitate modifying radio unit operational parameters, in accordance with an embodiment of this disclosure.

FIG. 7 illustrates an example process flow 700 that can facilitate modifying radio unit operational parameters, in accordance with an embodiment of this disclosure. In some examples, one or more embodiments of process flow 700 can be implemented by system architecture 300.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of process flow 800 of FIG. 8, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, process flow 1500 of FIG. 15, and/or process flow 1600 of FIG. 16.

Process flow 700 begins with 702, and moves to operation 704. Operation 704 depicts processing traffic and traffic load scheduling at a distributed unit to produce processed traffic. In some examples, this can be performed by a distributed unit of system architecture 300. In some examples, operation 704 can be performed by distributed unit that is configured to process traffic and traffic load scheduling to produce processed traffic, and to communicate the processed traffic and traffic load scheduling to the radio unit 402 of FIG. 4.

After operation 704, process flow 700 moves to operation 706.

Operation 706 depicts modifying operational parameters of a radio unit based on the processed traffic and traffic load scheduling. In some examples, this can be performed by a radio unit of system architecture 300. In some examples, operation 706 can be performed by radio unit that is configured to modify operational parameters of the radio unit based on the processed traffic and traffic load scheduling received from the distributed unit 404

After operation 706, process flow 700 moves to 708, where process flow 700 ends.

Figure 8:
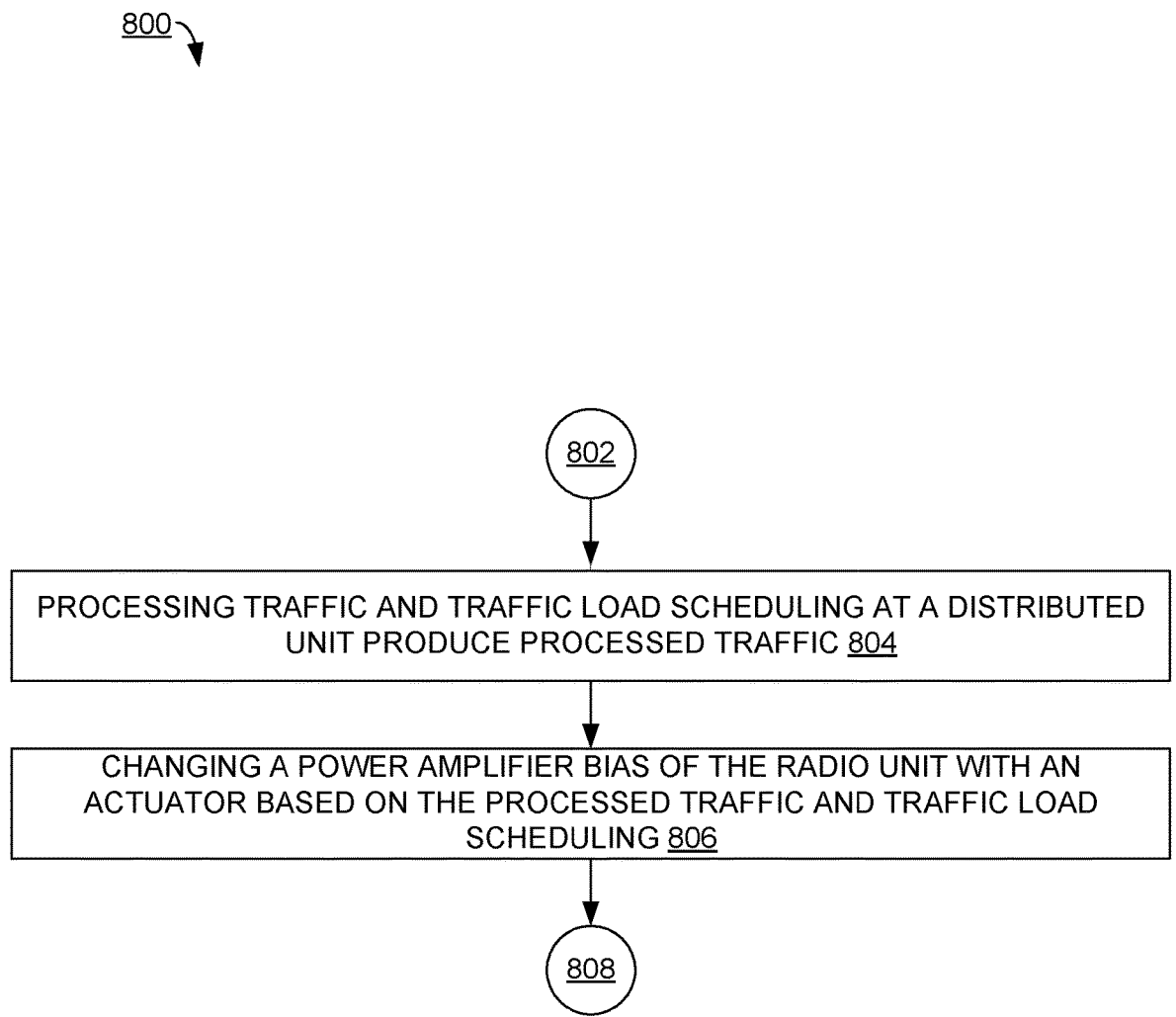
FIG. 8 illustrates another example process flow that can facilitate modifying radio unit operational parameters, in accordance with an embodiment of this disclosure.

FIG. 8 illustrates another example process flow 800 that can facilitate modifying radio unit operational parameters, in accordance with an embodiment of this disclosure. In some examples, one or more embodiments of process flow 800 can be implemented by system architecture 300.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of process flow 700 of FIG. 7, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, process flow 1500 of FIG. 15, and/or process flow 1600 of FIG. 16.

Process flow 800 begins with 802, and moves to operation 804. Operation 804 depicts processing traffic and traffic load scheduling at a distributed unit produce processed traffic. In some examples, operation 804 can be implemented in a similar manner as operation 704 of FIG. 7.

After operation 804, process flow 800 moves to operation 806.

Operation 806 depicts changing a power amplifier bias of the radio unit with an actuator based on the processed traffic and traffic load scheduling. That is, a radio unit can perform a change to power amplifier bias via actuators to improve (e.g., lessen power consumption) of a radio.

After operation 806, process flow 800 move to 808, where process flow 800 ends.

Figure 9:
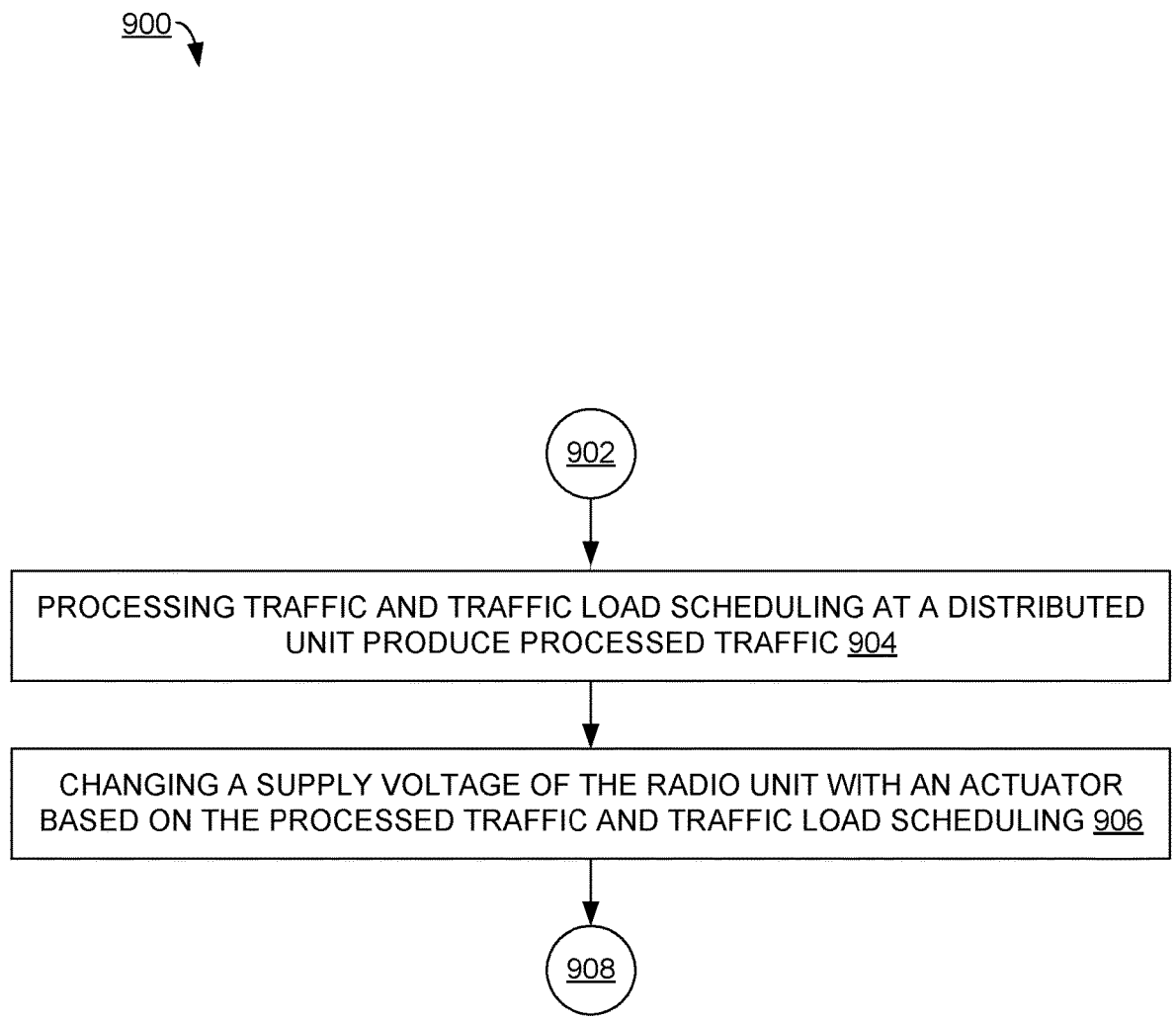
FIG. 9 illustrates another example process flow that can facilitate modifying radio unit operational parameters, in accordance with an embodiment of this disclosure.

FIG. 9 illustrates another example process flow 900 that can facilitate modifying radio unit operational parameters, in accordance with an embodiment of this disclosure. In some examples, one or more embodiments of process flow 900 can be implemented by system architecture 300.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of process flow 700 of FIG. 7, process flow 800 of FIG. 8, process flow 1000 of FIG. 10, process flow 1100 of FIG. 11, process flow 1200 of FIG. 12, process flow 1300 of FIG. 13, process flow 1400 of FIG. 14, process flow 1500 of FIG. 15, and/or process flow 1600 of FIG. 16.

Process flow 900 begins with 902, and moves to operation 904. Operation 904 depicts processing traffic and traffic load scheduling at a distributed unit produce processed traffic. In some examples, operation 904 can be implemented in a similar manner as operation 704 of FIG. 7.

After operation 904, process flow 900 moves to operation 906.

Operation 906 depicts changing a supply voltage of the radio unit with an actuator based on the processed traffic and traffic load scheduling. That is, a radio unit can perform a change to supply voltage ($V_{dd}$) via actuators to improve (e.g., lessen power consumption) of a radio.

After operation 906, process flow 900 moves to 908, where process flow 900 ends.

Figure 10:
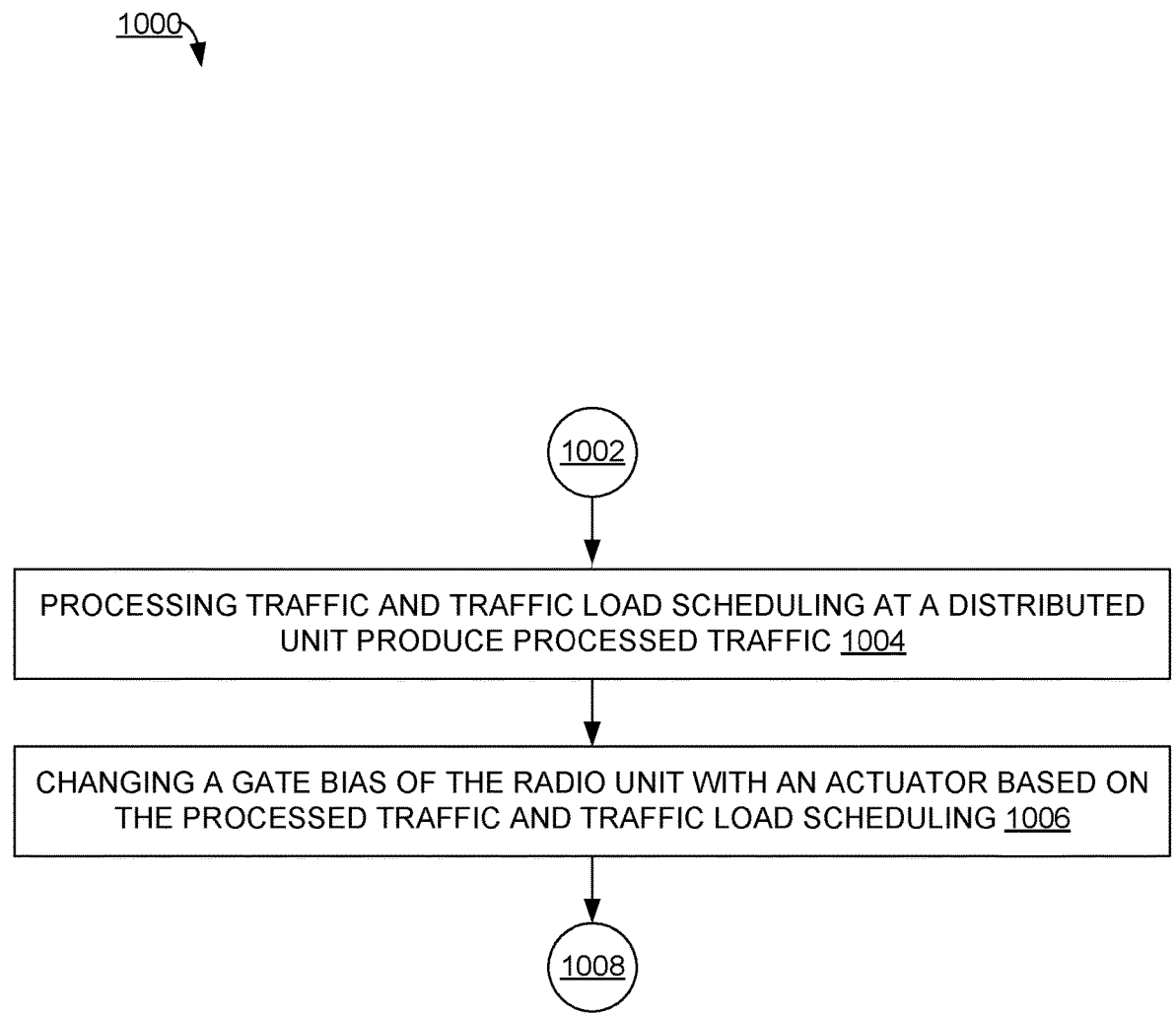
FIG. 10 illustrates another example process flow that can facilitate modifying radio unit operational parameters, in accordance with an embodiment of this disclosure.

FIG. 10 illustrates another example process flow 1000 that can facilitate modifying radio unit operational parameters, in accordance with an embodiment of this disclosure. In some examples, one or more embodiments of process flow 1000 can be implemented by system architecture 300.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of process flow 700 of FIG. 7, process flow 800 of FIG. 8, process flow 900 of FIG. 9, process flow 1100 of FIG. 11, process flow 1200 of FIG. 12, process flow 1300 of FIG. 13, process flow 1400 of FIG. 14, process flow 1500 of FIG. 15, and/or process flow 1600 of FIG. 16.

Process flow 1000 begins with 1002, and moves to operation 1004. Operation 1004 depicts processing traffic and traffic load scheduling at a distributed unit produce processed traffic. In some examples, operation 1004 can be implemented in a similar manner as operation 704 of FIG. 7.

After operation 1004, process flow 1000 moves to operation 1006.

Operation 1006 depicts changing a gate bias of the radio unit with an actuator based on the processed traffic and traffic load scheduling. That is, a radio unit can perform a change to gate biases via actuators to improve (e.g., lessen power consumption) of a radio.

After operation 1006, process flow 1000 moves to 1008, where process flow 1000 ends.

Figure 11:
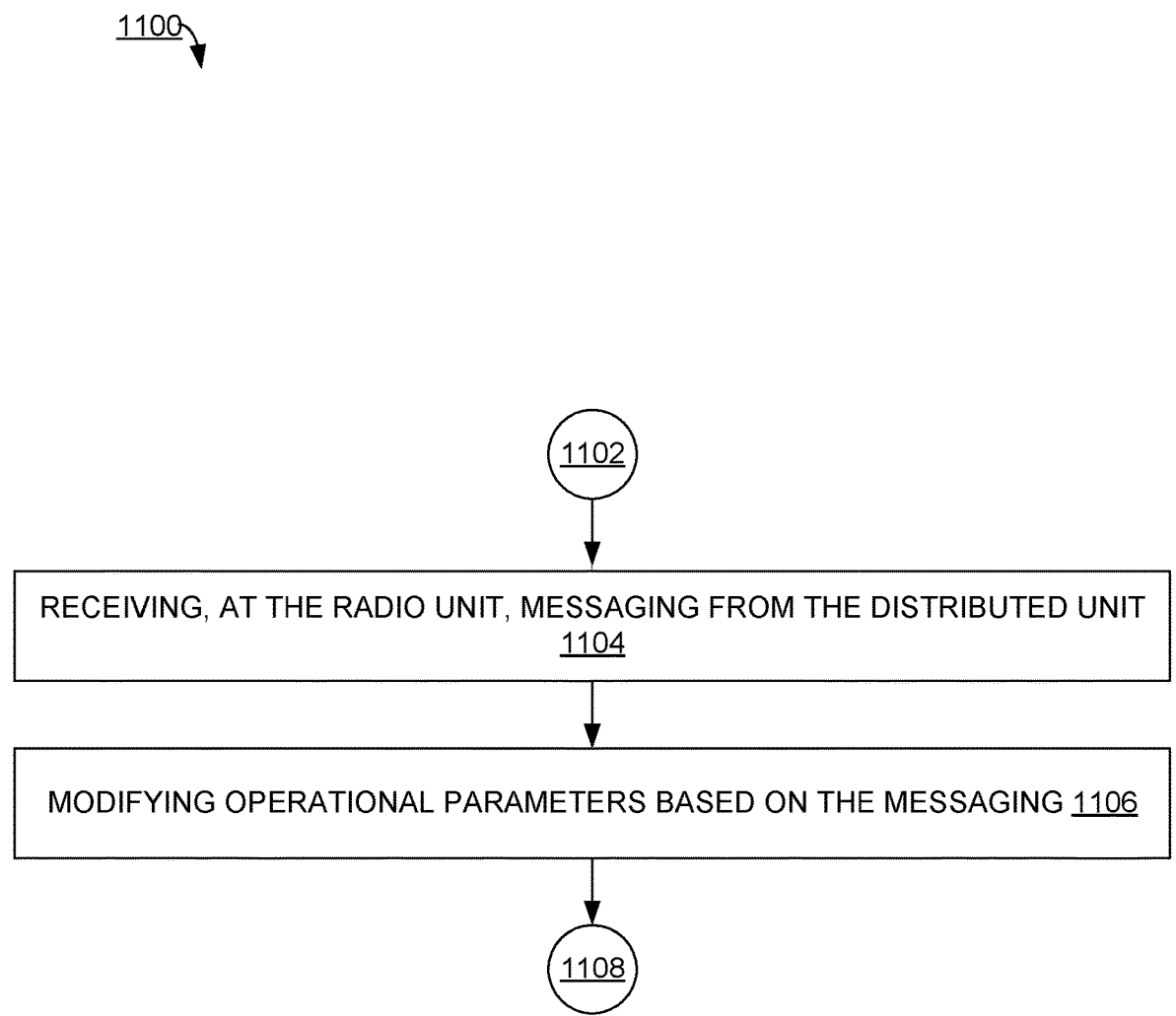
FIG. 11 illustrates another example process flow that can facilitate modifying radio unit operational parameters, in accordance with an embodiment of this disclosure.

FIG. 11 illustrates another example process flow 1100 that can facilitate modifying radio unit operational parameters, in accordance with an embodiment of this disclosure. In some examples, one or more embodiments of process flow 1100 can be implemented by system architecture 300.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of process flow 700 of FIG. 7, process flow 800 of FIG. 8, process flow 900 of FIG. 9, process flow 1000 of FIG. 10, process flow 1200 of FIG. 12, process flow 1300 of FIG. 13, process flow 1400 of FIG. 14, process flow 1500 of FIG. 15, and/or process flow 1600 of FIG. 16.

Process flow 1100 begins with 1102, and moves to operation 1104. Operation 1104 depicts receiving, at the radio unit, messaging from the distributed unit.

In some examples this messaging can be sent via a c-plane of C-plane, M-plane, and S-plane 174. After operation 1104, process flow 1100 moves to operation 1106.

Operation 1106 depicts modifying operational parameters based on the messaging. Using the example of FIGS. 1A-1C, this can comprise engaging control and actuation 160 to change operational parameters such as a power amplifier bias. That is, messaging from the distributed unit and to the radio unit can be used to modify operational parameters in the radio unit.

After operation 1106, process flow 1100 moves to 1108, where process flow 1100 ends.

Figure 12:
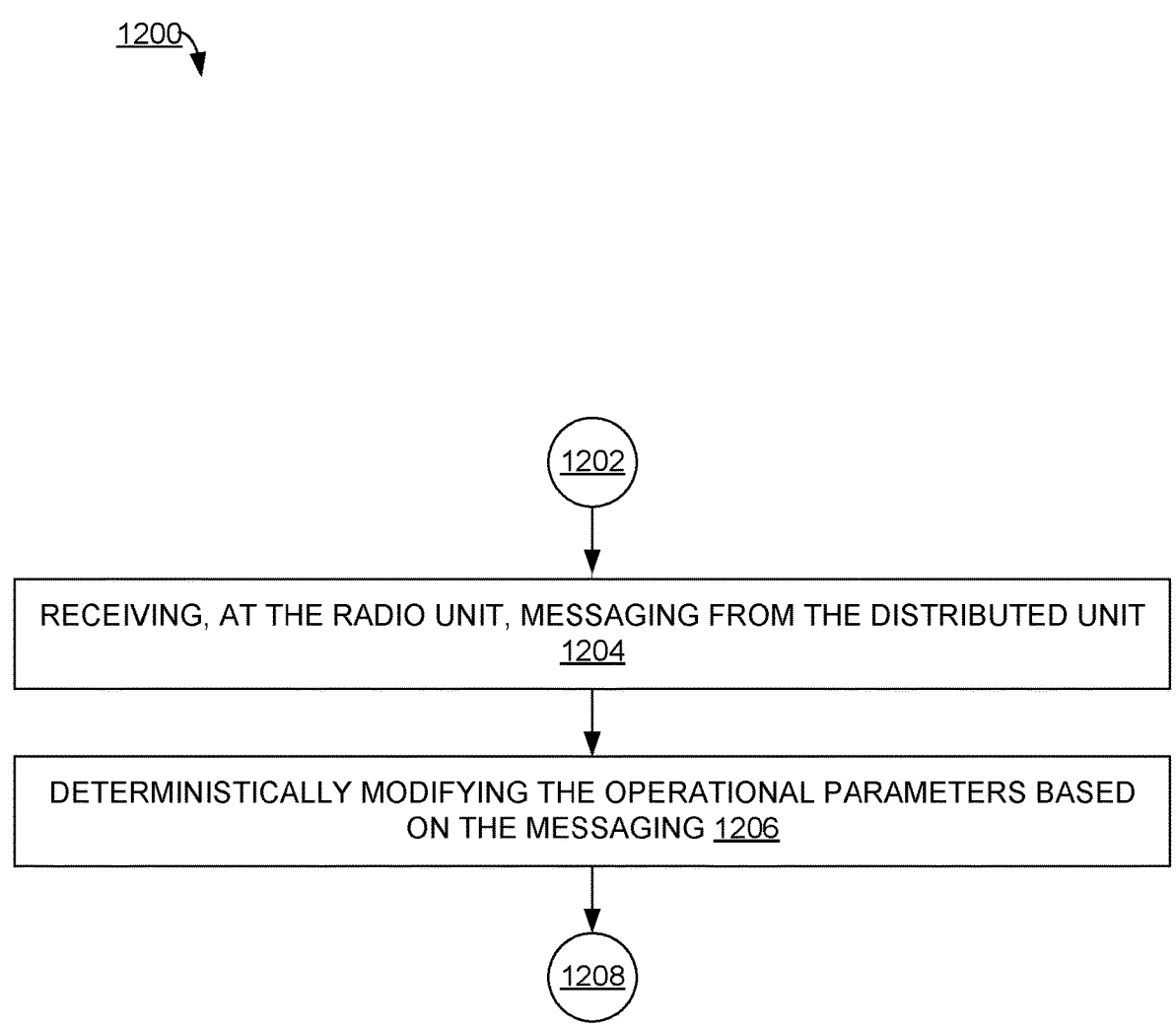
FIG. 12 illustrates another example process flow that can facilitate modifying radio unit operational parameters, in accordance with an embodiment of this disclosure.

FIG. 12 illustrates another example process flow 1200 that can facilitate modifying radio unit operational parameters, in accordance with an embodiment of this disclosure. In some examples, one or more embodiments of process flow 1200 can be implemented by system architecture 300.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of process flow 700 of FIG. 7, process flow 800 of FIG. 8, process flow 900 of FIG. 9, process flow 1000 of FIG. 10, process flow 1100 of FIG. 11, process flow 1300 of FIG. 13, process flow 1400 of FIG. 14, process flow 1500 of FIG. 15, and/or process flow 1600 of FIG. 16.

Process flow 1200 begins with 1202, and moves to operation 1204. Operation 1204 depicts receiving, at the radio unit, messaging from the distributed unit. In some examples, operation 1204 can be implemented in a manner similar to operation 1104 of FIG. 11.

After operation 1204, process flow 1200 moves to operation 1206.

Operation 1206 depicts deterministically modifying the operational parameters based on the messaging. That is, the operational parameters can be modified based on predetermined operations on an input of messaging from the distributed unit.

After operation 1206, process flow 1200 moves to 1208, where process flow 1200 ends.

Figure 13:
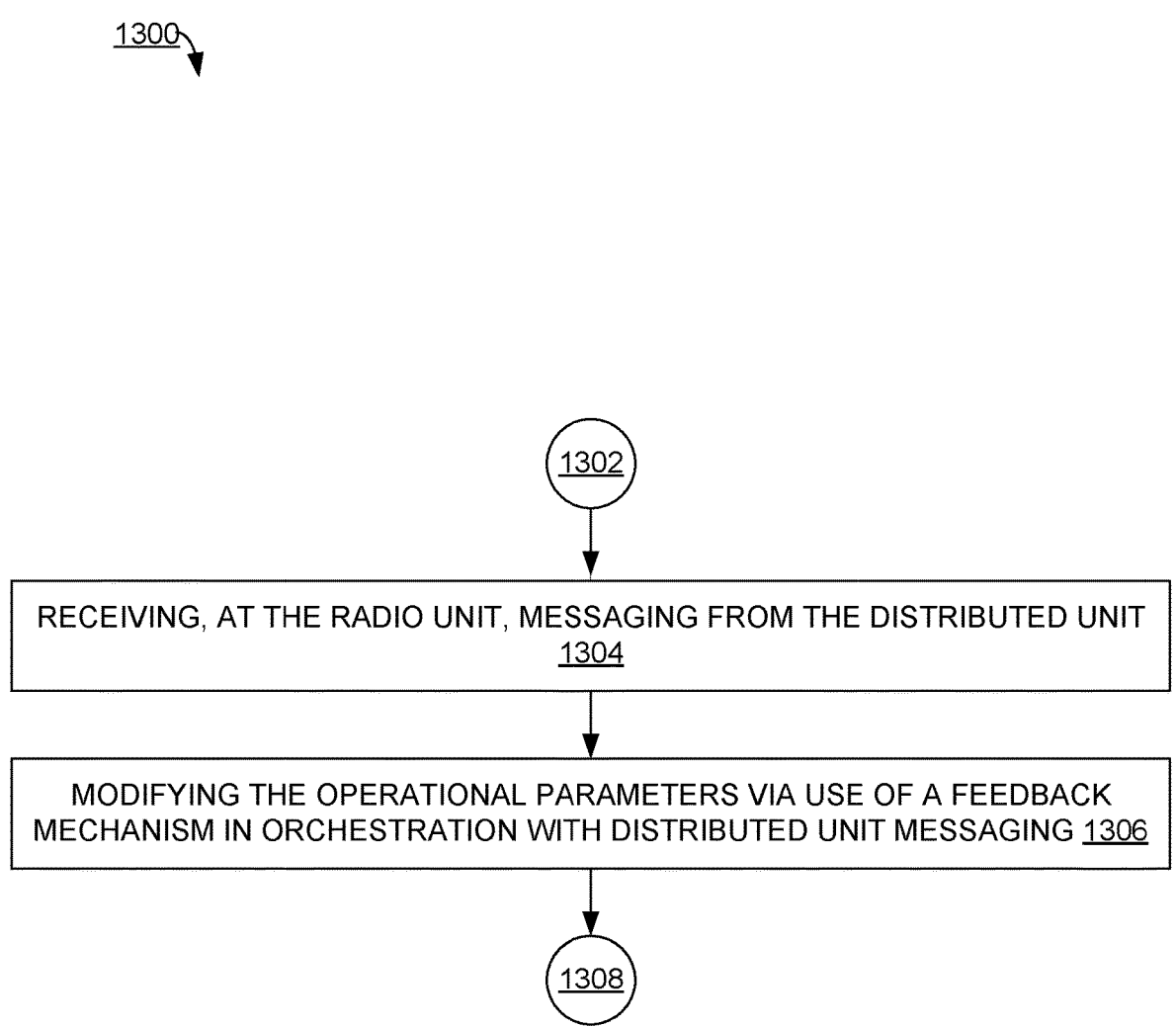
FIG. 13 illustrates another example process flow that can facilitate modifying radio unit operational parameters, in accordance with an embodiment of this disclosure.

FIG. 13 illustrates another example process flow 1300 that can facilitate modifying radio unit operational parameters, in accordance with an embodiment of this disclosure.

In some examples, one or more embodiments of process flow 1300 can be implemented by system architecture 300.

It can be appreciated that the operating procedures of process flow 1300 are example operating procedures, and that there can be embodiments that implement more or fewer operating procedures than are depicted, or that implement the depicted operating procedures in a different order than as depicted. In some examples, process flow 1300 can be implemented in conjunction with one or more embodiments of process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1400 of FIG. 14, process flow 1500 of FIG. 15, and/or process flow 1600 of FIG. 16.

Process flow 1300 begins with 1302, and moves to operation 1304. Operation 1304 depicts receiving, at the radio unit, messaging from the distributed unit. In some examples, operation 1304 can be implemented in a manner similar to operation 1104 of FIG. 11.

After operation 1304, process flow 1300 moves to operation 1306.

Operation 1306 depicts modifying the operational parameters via use of a feedback mechanism in orchestration with distributed unit messaging. That is, a radio unit can have a feedback mechanism that receives information about how modifying the operational parameters has affected function of the radio unit, and can use this information in conjunction with messaging from the distributed unit to determine how to further modify (e.g., fine tune) operational parameters.

After operation 1306, process flow 1300 moves to 1308, where process flow 1300 ends.

Figure 14:
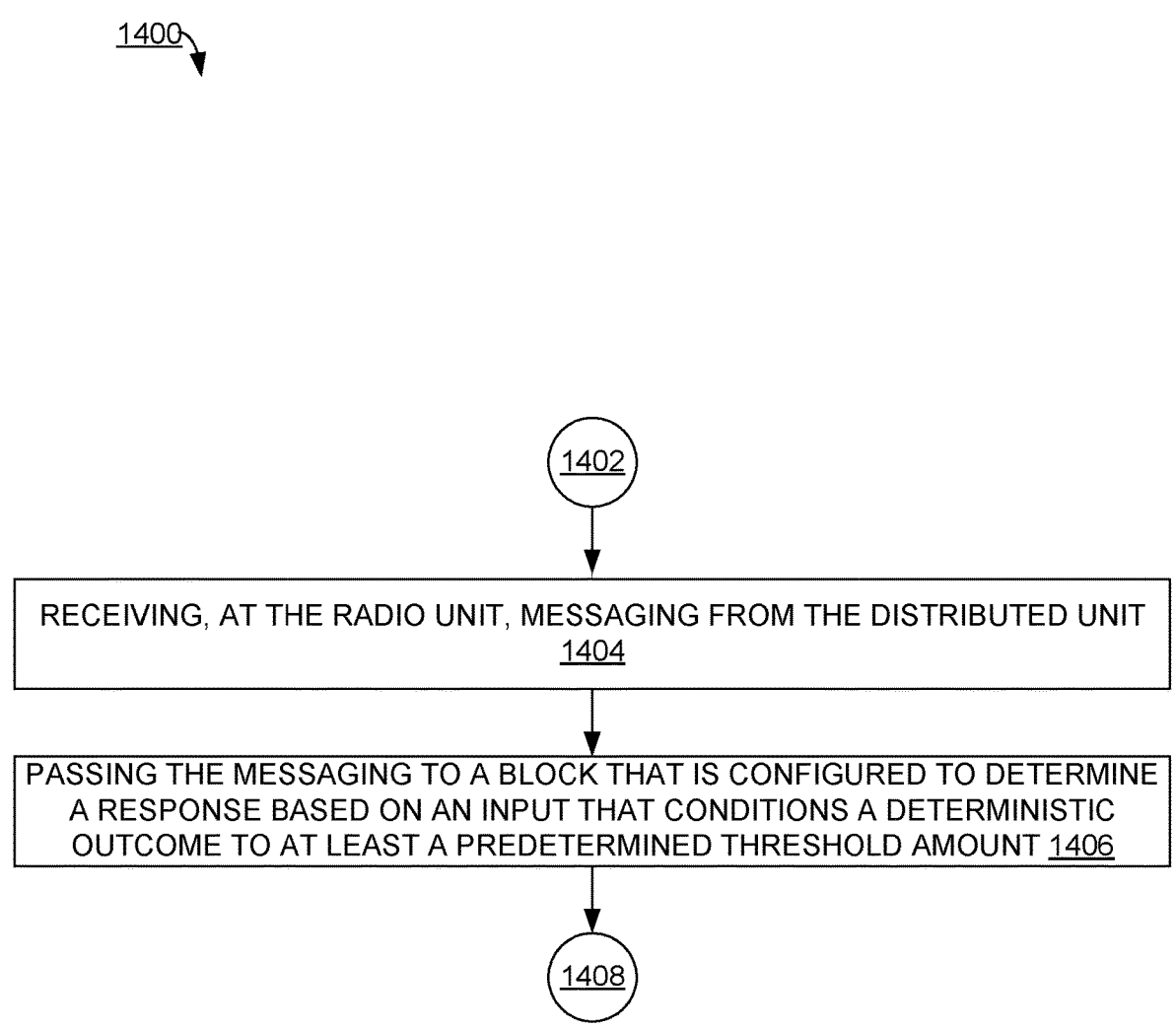
FIG. 14 illustrates another example process flow that can facilitate modifying radio unit operational parameters, in accordance with an embodiment of this disclosure.

FIG. 14 illustrates another example process flow 1400 that can facilitate modifying radio unit operational parameters, in accordance with an embodiment of this disclosure. In some examples, one or more embodiments of process flow 1400 can be implemented by system architecture 300.

It can be appreciated that the operating procedures of process flow 1400 are example operating procedures, and that there can be embodiments that implement more or fewer operating procedures than are depicted, or that implement the depicted operating procedures in a different order than as depicted. In some examples, process flow 1400 can be implemented in conjunction with one or more embodiments of process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, process flow 1500 of FIG. 15, and/or process flow 1600 of FIG. 16.

Process flow 1400 begins with 1402, and moves to operation 1404. Operation 1404 depicts receiving, at the radio unit, messaging from the distributed unit. In some examples, operation 1404 can be implemented in a manner similar to operation 1104 of FIG. 11.

After operation 1404, process flow 1400 moves to operation 1406.

Operation 1406 depicts passing the messaging to a block that is configured to determine a response based on an input that conditions a deterministic outcome to at least a predetermined threshold amount. That is, operational parameters can be modified prescriptively based on messaging from the distributed unit. In some examples, messaging from the distributed unit can be received by the radio unit and passed to a block (e.g., a digital front end chain block) that is configured to determine operational parameters to modify, and create a response based on the input that further conditions a deterministic outcome to a desired degree. In some examples, this can be performed by logic of an AND gate.

After operation 1406, process flow 1400 moves to 1408, where process flow 1400 ends.

Figure 15:
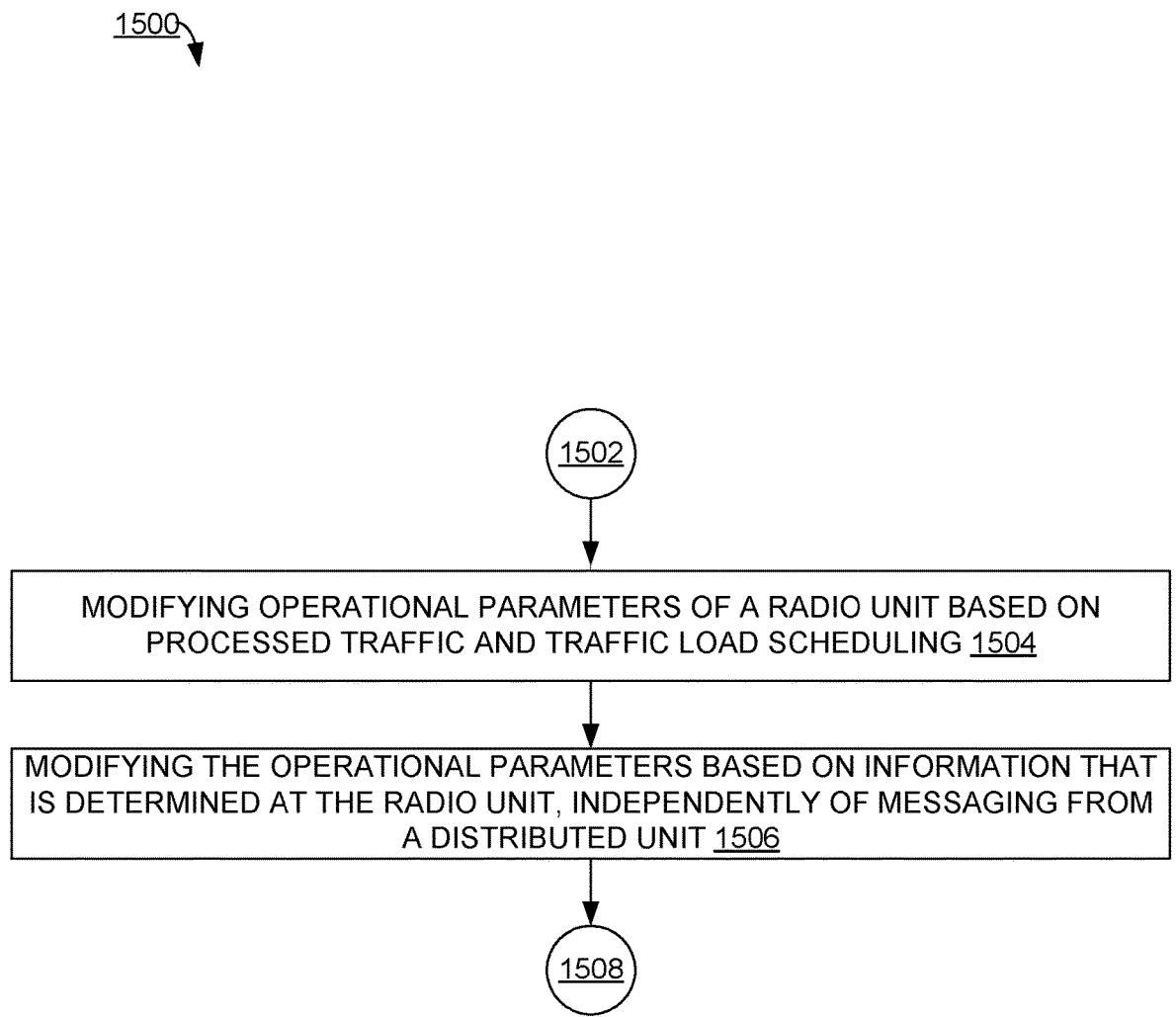
FIG. 15 illustrates another example process flow that can facilitate modifying radio unit operational parameters, in accordance with an embodiment of this disclosure.

FIG. 15 illustrates another example process flow 1500 that can facilitate modifying radio unit operational parameters, in accordance with an embodiment of this disclosure. In some examples, one or more embodiments of process flow 1500 can be implemented by system architecture 300.

It can be appreciated that the operating procedures of process flow 1500 are example operating procedures, and that there can be embodiments that implement more or fewer operating procedures than are depicted, or that implement the depicted operating procedures in a different order than as depicted. In some examples, process flow 1500 can be implemented in conjunction with one or more embodiments of process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, and/or process flow 1600 of FIG. 16.

Process flow 1500 begins with 1502, and moves to operation 1504. Operation 1504 depicts modifying operational parameters of a radio unit based on processed traffic and traffic load scheduling. This can be similar to processed traffic and traffic load scheduling in operation 706 of FIG. 7. In some examples, operation 1504 can be implemented by modifying component that is configured to modify operational parameters of a radio unit of the radio system based on the processed traffic and traffic load scheduling 604 of FIG. 6.

After operation 1504, process flow 1500 moves to operation 1506.

Operation 1506 depicts modifying the operational parameters based on information that is determined at the radio unit, independently of messaging from a distributed unit. That is, the radio unit can make determinations about operation of the radio unit, and use these determinations to further modify operational parameters.

After operation 1506, process flow 1500 moves to 1508, where process flow 1500 ends.

Figure 16:
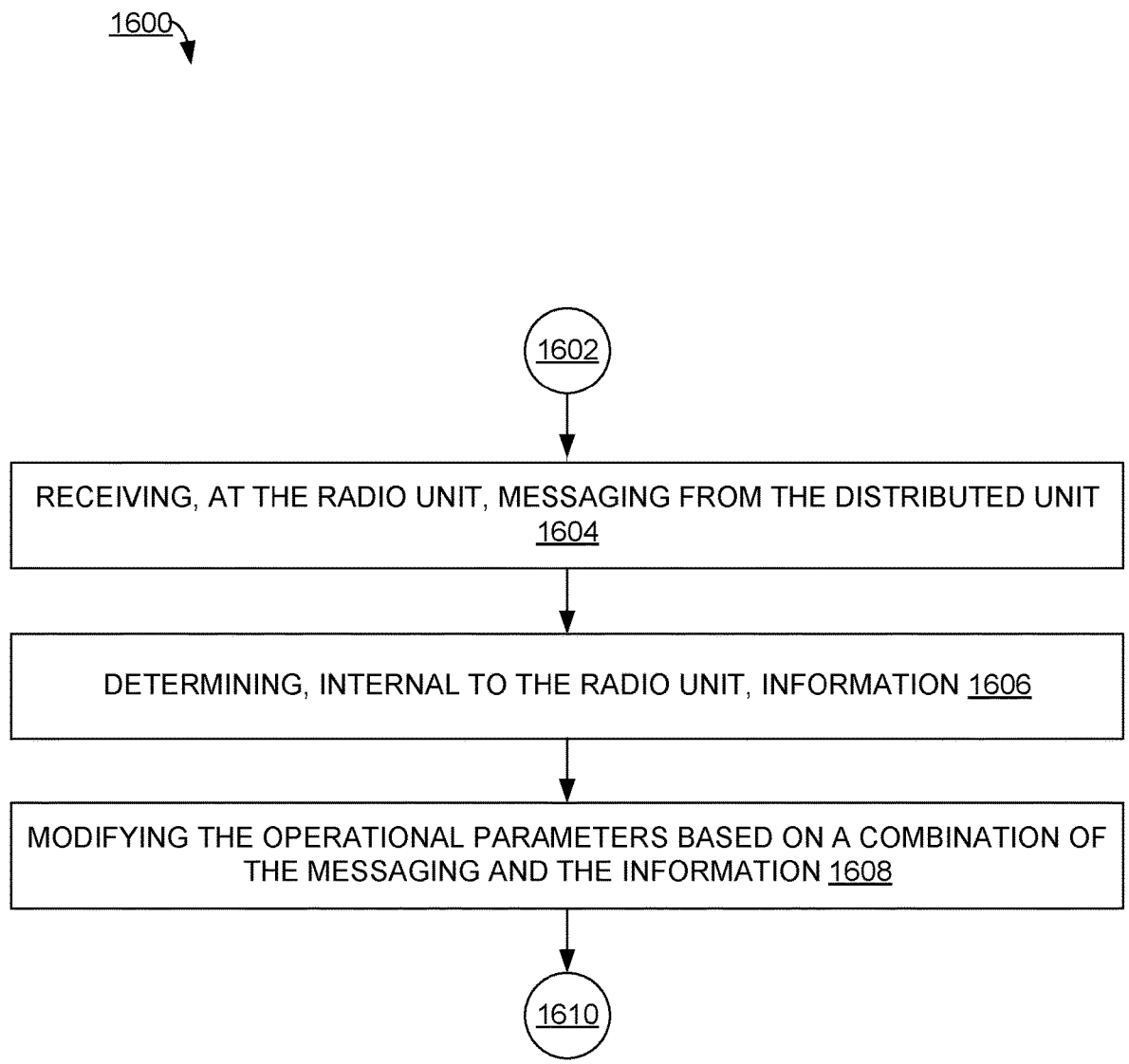
FIG. 16 illustrates another example process flow that can facilitate modifying radio unit operational parameters, in accordance with an embodiment of this disclosure.

FIG. 16 illustrates another example process flow 1600 that can facilitate modifying radio unit operational parameters, in accordance with an embodiment of this disclosure. In some examples, one or more embodiments of process flow 1600 can be implemented by system architecture 300.

It can be appreciated that the operating procedures of process flow 1600 are example operating procedures, and that there can be embodiments that implement more or fewer operating procedures than are depicted, or that implement the depicted operating procedures in a different order than as depicted. In some examples, process flow 1600 can be implemented in conjunction with one or more embodiments of process flow 700 of FIG. 7, process flow 800 of FIG. 8, process flow 900 of FIG. 9, process flow 1000 of FIG. 10, process flow 1100 of FIG. 11, process flow 1200 of FIG. 12, process flow 1300 of FIG. 13, process flow 1400 of FIG. 14, and/or process flow 1500 of FIG. 15.

Process flow 1600 begins with 1602, and moves to operation 1604. Operation 1604 depicts receiving, at the radio unit, messaging from the distributed unit. In some examples, operation 1604 can be implemented in a similar manner as operation 1104 of FIG. 11.

After operation 1604, process flow 1600 moves to operation 1606.

Operation 1606 depicts determining, internal to the radio unit, information. This can be information about operation of the radio unit that is determined by the radio unit.

After operation 1606, process flow 1600 moves to operation 1608.

Operation 1608 depicts modifying the operational parameters based on a combination of the messaging and the information. That is, in some examples, a hybrid of both messaging from the distributed unit and information determined by the radio unit that is internal to the radio unit (and independent of distributed unit messaging) can be used to modify operational parameters.

After operation 1608, process flow 1600 moves to 1610, where process flow 1600 end.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a distributed unit that is configured to process traffic and traffic load scheduling to produce processed traffic, and to communicate the processed traffic and the traffic load scheduling to a radio unit; and
the radio unit that is configured to modify operational parameters of the radio unit based on the processed traffic, the traffic load scheduling received from the distributed unit, and a feedback process that is in orchestration with messaging from the distributed unit, wherein the radio unit executes the feedback process, and wherein the feedback process comprises providing information to the radio unit about how modifying the operational parameters of the radio unit has affected function of the radio unit.

2. The system of claim 1, further comprising:
at least one actuator of the radio unit that is configured to engage to modify the operational parameters.

3. The system of claim 2, wherein modifying the operational parameters by the actuator is timed and synchronized with a dynamic load of signal data received by the radio unit.

4. The system of claim 1, wherein modifying the operational parameters of the radio unit improves an operational efficiency of the radio unit.

5. The system of claim 1, wherein modifying the operational parameters comprises:
deterministically modifying the operational parameters based on the messaging from the distributed unit.

6. The system of claim 1, wherein modifying the operational parameters comprises:
passing the messaging to a block that is configured to determine a response based on an input that conditions a deterministic outcome to at least a predetermined threshold amount.

7. The system of claim 1, wherein modifying the operational parameters of the radio unit comprises:
changing a power amplifier bias of the radio unit with an actuator,
changing a supply voltage of the radio unit with the actuator,
changing a gate bias of the radio unit with the actuator,
deterministically modifying the operational parameters based on the messaging from the distributed unit,
passing the messaging to a block that is configured to determine a response based on an input that conditions a deterministic outcome to at least a predetermined threshold amount, or
modifying the operational parameters based on information that is determined at the radio unit, independently of the messaging from the distributed unit.

8. A method, comprising:
processing, by a system comprising at least one processor, traffic and traffic load scheduling at a distributed unit to produce processed traffic; and
modifying, by the system, operational parameters of a radio unit based on the processed traffic, the traffic load scheduling, messaging from the distributed unit that is received by the radio unit, and a feedback mechanism in orchestration with the messaging from the distributed unit, wherein the radio unit comprises the feedback mechanism, and wherein the feedback mechanism is configured to provide information to the radio unit about how modifying the operational parameters of the radio unit has affected function of the radio unit.

9. The method of claim 8, wherein modifying the operational parameters of the radio unit comprises:
changing, by the system, a power amplifier bias of the radio unit with an actuator.

10. The method of claim 8, wherein modifying the operational parameters of the radio unit comprises:
changing, by the system, a supply voltage of the radio unit with an actuator.

11. The method of claim 8, wherein modifying the operational parameters of the radio unit comprises:
changing, by the system, a gate bias of the radio unit with an actuator.

12. The method of claim 8, wherein modifying the operational parameters comprises:
deterministically modifying, by the system, the operational parameters based on the messaging from the distributed unit.

13. The method of claim 8, wherein modifying the operational parameters comprises:
passing the messaging to a block that is configured to determine a response based on an input that conditions a deterministic outcome to at least a predetermined threshold amount.

14. The method of claim 8, wherein modifying the parameters of the radio unit comprises:
modifying the operational parameters based on information that is determined at the radio unit, independently of the messaging from the distributed unit.

15. An apparatus, comprising:
a processing component that is configured to process traffic and traffic load scheduling at a distributed unit of a radio system to produce processed traffic; and
a modifying component that is configured to modify operational parameters of a radio unit of the radio system based on the processed traffic, the traffic load scheduling, messaging from the distributed unit that is received by the radio unit, and a feedback process in orchestration with the messaging from the distributed unit, wherein the radio unit manages the feedback process, and wherein the feedback process comprises providing information to the radio unit about how modifying the operational parameters of the radio unit has affected function of the radio unit.

16. The apparatus of claim 15, wherein the modifying component is further configured to modify the operational parameters by engaging an actuator of the radio unit, and wherein the modifying component is further configured to modify signal timing and synchronization associated with an actuator component relative to the radio unit.

17. The apparatus of claim 15, wherein the modifying component is further configured to modify the operational parameters by engaging an actuator of the radio unit, and
wherein the modifying component is further configured to modify performance of the radio unit to facilitate increasing a traffic load,
wherein the modifying component is further configured to modify the performance of the radio unit to facilitate lessening the traffic load,
wherein the modifying component is further configured to modify the performance of the radio unit based on determining that the traffic load has decreased,
wherein the modifying component is further configured to modify the performance of the radio unit to facilitate lowering a thermal stress, or
wherein the modifying component is further configured to modify the performance of the radio unit based on a modulation coding scheme level.

18. The apparatus of claim 15, wherein the radio unit is configured to communicate to the distributed unit a request to lessen the traffic load, and wherein the distributed unit is configured to communicate to the radio unit an indication that the traffic load has been lessened.

19. The apparatus of claim 15, wherein the distributed unit is configured to withhold scheduling of the traffic independent of the radio unit, wherein withholding the scheduling of the traffic comprises modifying a duty cycle of the traffic, and wherein the withholding of the scheduling of the traffic reduces a power consumption of the radio unit.

20. The apparatus of claim 15, wherein the radio unit is configured to reduce a power amplifier bias parameter in response to the distributed unit withholding scheduling of the traffic.

* * * * *